US011749804B2

(12) United States Patent
Chen et al.

(10) Patent No.: US 11,749,804 B2
(45) Date of Patent: Sep. 5, 2023

(54) ELECTROCHEMICAL CELLS WITH ELECTRODE MATERIAL COUPLED DIRECTLY TO FILM AND METHODS OF MAKING THE SAME

(71) Applicant: 24M Technologies, Inc., Cambridge, MA (US)

(72) Inventors: Junzheng Chen, Concord, MA (US); Landon Oakes, Cambridge, MA (US); Naoki Ota, Lexington, MA (US)

(73) Assignee: 24M Technologies, Inc., Cambridge, MA (US)

( * ) Notice: Subject to any disclaimer, the term of this patent is extended or adjusted under 35 U.S.C. 154(b) by 0 days.

(21) Appl. No.: 17/181,554

(22) Filed: Feb. 22, 2021

(65) Prior Publication Data

US 2021/0265631 A1 Aug. 26, 2021

Related U.S. Application Data

(60) Provisional application No. 62/979,568, filed on Feb. 21, 2020.

(51) Int. Cl.
*H01M 4/62* (2006.01)
*H01M 50/105* (2021.01)
(Continued)

(52) U.S. Cl.
CPC .......... *H01M 4/62* (2013.01); *H01M 4/0402* (2013.01); *H01M 4/64* (2013.01); *H01M 50/105* (2021.01); *H01M 50/536* (2021.01)

(58) Field of Classification Search
CPC ........ H01M 4/62; H01M 4/0402; H01M 4/64; H01M 50/105; H01M 50/536
See application file for complete search history.

(56) References Cited

U.S. PATENT DOCUMENTS 8,722,226 B2   5/2014  Chiang et al.
8,722,227 B2   5/2014  Chiang et al.
(Continued)

FOREIGN PATENT DOCUMENTS

KR   101825624   2/2018

OTHER PUBLICATIONS

International Search Report and Written Opinion for International Application No. PCT/US2021/019054, dated Jun. 2, 2021, 23 pages.

*Primary Examiner* — Christopher P Domone
*Assistant Examiner* — Kimberly Wyluda
(74) *Attorney, Agent, or Firm* — Cooley LLP

(57) ABSTRACT

Embodiments described herein relate to electrochemical cells with one or more electrodes coupled directly to a film material, and methods of making the same. In some embodiments, an electrochemical cell includes a first electrode material disposed on a first current collector, wherein the first current collector is coupled to a first non-conductive film. In some embodiments, a first tab is coupled to the first current collector. The electrochemical cell further includes a second electrode material capable of taking up or releasing ions during operation of the electrochemical cell. The second electrode material is coupled directly to a second non-conductive film. A second tab is electronically coupled to the second electrode material. A separator is disposed between the first electrode material and the second electrode material. In some embodiments, the second tab can be coupled directly to the second electrode material.

24 Claims, 6 Drawing Sheets

(51) Int. Cl.
    *H01M 50/536*    (2021.01)
    *H01M 4/04*    (2006.01)
    *H01M 4/64*    (2006.01)

(56) References Cited

U.S. PATENT DOCUMENTS

| | | |
|---|---|---|
| 8,778,552 B2 | 7/2014 | Chiang et al. |
| 8,993,159 B2 | 3/2015 | Chiang et al. |
| 9,153,833 B2 | 10/2015 | Chiang et al. |
| 9,178,200 B2 | 11/2015 | Bazzarella et al. |
| 9,184,464 B2 | 11/2015 | Chiang et al. |
| 9,203,092 B2 | 12/2015 | Slocum et al. |
| 9,293,781 B2 | 3/2016 | Chiang et al. |
| 9,362,583 B2 | 6/2016 | Chiang et al. |
| 9,385,392 B2 | 7/2016 | Chiang et al. |
| 9,401,501 B2 | 7/2016 | Bazzarella et al. |
| 9,437,864 B2 | 9/2016 | Tan et al. |
| 9,484,569 B2 | 11/2016 | Doherty et al. |
| 9,583,780 B2 | 2/2017 | Chiang et al. |
| 9,614,231 B2 | 4/2017 | Carter et al. |
| 9,786,944 B2 | 10/2017 | Chiang et al. |
| 9,812,674 B2 | 11/2017 | Bazzarella et al. |
| 9,825,280 B2 | 11/2017 | Chiang et al. |
| 9,831,518 B2 | 11/2017 | Chiang et al. |
| 9,831,519 B2 | 11/2017 | Chiang et al. |
| 9,831,522 B2 | 11/2017 | Tan et al. |
| 10,115,970 B2 | 10/2018 | Ota et al. |
| 10,122,044 B2 | 11/2018 | Tan et al. |
| 10,153,651 B2 | 12/2018 | Taylor et al. |
| 10,181,587 B2 | 1/2019 | Ota et al. |
| 10,230,128 B2 | 3/2019 | Chiang et al. |
| 10,236,518 B2 | 3/2019 | Chiang et al. |
| 10,411,310 B2 | 9/2019 | Chiang et al. |
| 10,483,582 B2 | 11/2019 | Chiang et al. |
| 10,497,935 B2 | 12/2019 | Ota et al. |
| 10,522,870 B2 | 12/2019 | Tan et al. |
| 10,566,581 B2 | 2/2020 | Bazzarella et al. |
| 10,566,603 B2 | 2/2020 | Slocum et al. |
| 10,593,952 B2 | 3/2020 | Ota et al. |
| 10,601,239 B2 | 3/2020 | Taylor et al. |
| 10,637,038 B2 | 4/2020 | Zagars et al. |
| 10,734,672 B2 | 8/2020 | Chen et al. |
| 10,777,852 B2 | 9/2020 | Woodford et al. |
| 10,854,869 B2 | 12/2020 | Bazzarella et al. |
| 10,886,521 B2 | 1/2021 | Zagars et al. |
| 10,910,858 B2 | 2/2021 | Taylor et al. |
| 10,957,940 B2 | 3/2021 | Tan et al. |
| 10,964,973 B2 | 3/2021 | Tan et al. |
| 11,005,087 B2 | 5/2021 | Ota et al. |
| 11,018,365 B2 | 5/2021 | Chiang et al. |
| 11,024,903 B2 | 6/2021 | Ota et al. |
| 11,094,487 B2 | 8/2021 | Lawrence et al. |
| 11,094,976 B2 | 8/2021 | Chiang et al. |
| 11,121,437 B2 | 9/2021 | Bazzarella et al. |
| 11,139,467 B2 | 10/2021 | Zagars et al. |
| 2010/0047671 A1 | 2/2010 | Chiang et al. |
| 2010/0323264 A1 | 12/2010 | Chiang et al. |
| 2011/0189520 A1 | 8/2011 | Carter et al. |
| 2011/0200848 A1 | 8/2011 | Chiang et al. |
| 2011/0274948 A1 | 11/2011 | Duduta et al. |
| 2012/0164499 A1 | 6/2012 | Chiang et al. |
| 2013/0055559 A1 | 3/2013 | Slocum et al. |
| 2013/0065122 A1 | 3/2013 | Chiang et al. |
| 2013/0309547 A1 | 11/2013 | Bazzarella et al. |
| 2013/0337319 A1 | 12/2013 | Doherty et al. |
| 2014/0004437 A1 | 1/2014 | Slocum et al. |
| 2014/0030623 A1 | 1/2014 | Chiang et al. |
| 2014/0039710 A1 | 2/2014 | Carter et al. |
| 2014/0050969 A1 | 2/2014 | Rust, III et al. |
| 2014/0154546 A1 | 6/2014 | Carter et al. |
| 2014/0170524 A1 | 6/2014 | Chiang et al. |
| 2014/0248521 A1 | 9/2014 | Chiang et al. |
| 2014/0315097 A1 | 10/2014 | Tan et al. |
| 2015/0024279 A1 | 1/2015 | Tan et al. |
| 2015/0129081 A1 | 5/2015 | Chiang et al. |
| 2015/0140371 A1 | 5/2015 | Slocum et al. |
| 2015/0171406 A1 | 6/2015 | Bazzarella et al. |
| 2015/0280267 A1 | 10/2015 | Chiang et al. |
| 2015/0295272 A1 | 10/2015 | Chiang et al. |
| 2015/0357626 A1 | 12/2015 | Holman et al. |
| 2016/0013507 A1 | 1/2016 | Chiang et al. |
| 2016/0056490 A1 | 2/2016 | Chiang et al. |
| 2016/0056491 A1 | 2/2016 | Chiang et al. |
| 2016/0105042 A1 | 4/2016 | Taylor et al. |
| 2016/0126543 A1 | 5/2016 | Ota et al. |
| 2016/0133916 A1 | 5/2016 | Zagars et al. |
| 2016/0190544 A1 | 6/2016 | Slocum et al. |
| 2016/0218375 A1 | 7/2016 | Chiang et al. |
| 2016/0268621 A1 | 9/2016 | Chiang et al. |
| 2016/0308218 A1 | 10/2016 | Ota et al. |
| 2016/0344006 A1 | 11/2016 | Ota et al. |
| 2016/0372802 A1 | 12/2016 | Chiang et al. |
| 2017/0018798 A1 | 1/2017 | Tan et al. |
| 2017/0025646 A1 | 1/2017 | Ota et al. |
| 2017/0025674 A1 | 1/2017 | Tan et al. |
| 2017/0033389 A1 | 2/2017 | Chiang et al. |
| 2017/0033390 A1 | 2/2017 | Chiang et al. |
| 2017/0077464 A1 | 3/2017 | Bazzarella et al. |
| 2017/0162863 A1 | 6/2017 | Doherty et al. |
| 2017/0200943 A1 | 7/2017 | Kawakami |
| 2017/0214034 A1 | 7/2017 | Ota et al. |
| 2017/0237111 A1 | 8/2017 | Holman et al. |
| 2017/0237112 A1 | 8/2017 | Holman et al. |
| 2017/0288281 A1 | 10/2017 | Chiang et al. |
| 2018/0034090 A1 | 2/2018 | Chiang et al. |
| 2018/0175428 A1 | 6/2018 | Chiang et al. |
| 2018/0175445 A1 | 6/2018 | Tan et al. |
| 2018/0233708 A1 | 8/2018 | Bazzarella et al. |
| 2018/0233722 A1 | 8/2018 | Holman et al. |
| 2018/0287220 A1 | 10/2018 | Woodford et al. |
| 2019/0036101 A1 | 1/2019 | Tyler et al. |
| 2019/0058184 A1 | 2/2019 | Bazzarella et al. |
| 2019/0088925 A1* | 3/2019 | Harutyunyan ........ H01M 4/133 |
| 2019/0245242 A1 | 8/2019 | Tan et al. |
| 2019/0319460 A1 | 10/2019 | Taylor et al. |
| 2019/0326562 A1 | 10/2019 | Ota et al. |
| 2019/0348705 A1 | 11/2019 | Chen et al. |
| 2019/0355998 A1 | 11/2019 | Chiang et al. |
| 2019/0363351 A1 | 11/2019 | Ota et al. |
| 2019/0393477 A1 | 12/2019 | Lawrence et al. |
| 2020/0014025 A1 | 1/2020 | Zagars et al. |
| 2020/0044296 A1 | 2/2020 | Chiang et al. |
| 2020/0106094 A1 | 4/2020 | Ota et al. |
| 2020/0161688 A1 | 5/2020 | Chaing et al. |
| 2020/0220118 A1 | 7/2020 | Bazzarella et al. |
| 2020/0220204 A1 | 7/2020 | Tan et al. |
| 2020/0259338 A1 | 8/2020 | Taylor et al. |
| 2020/0321597 A1 | 10/2020 | Zagars et al. |
| 2020/0321601 A1 | 10/2020 | Slocum et al. |
| 2020/0358129 A1 | 11/2020 | Chen et al. |
| 2020/0411825 A1 | 12/2020 | Bazzarella et al. |
| 2021/0091366 A1 | 3/2021 | Bazzarella et al. |
| 2021/0167351 A1 | 6/2021 | Zagars et al. |
| 2021/0202935 A1* | 7/2021 | Wang ................... H01M 4/628 |
| 2021/0226192 A1 | 7/2021 | Aranami et al. |
| 2021/0249695 A1 | 8/2021 | Aranami et al. |
| 2021/0376380 A1 | 12/2021 | Tan et al. |
| 2022/0037749 A1 | 2/2022 | Bazzarella et al. |
| 2022/0052403 A1 | 2/2022 | Chen et al. |
| 2022/0077445 A1 | 3/2022 | Ota et al. |
| 2022/0085440 A1 | 3/2022 | Ota et al. |
| 2022/0093929 A1 | 3/2022 | Chen et al. |
| 2022/0115710 A1 | 4/2022 | Zagars et al. |
| 2022/0172916 A1 | 6/2022 | Lawrence et al. |
| 2022/0173446 A1 | 6/2022 | Chiang et al. |

* cited by examiner

ELECTROCHEMICAL CELLS WITH ELECTRODE MATERIAL COUPLED DIRECTLY TO FILM AND METHODS OF MAKING THE SAME

CROSS-REFERENCE TO RELATED APPLICATIONS

This application claims the priority to and the benefit of U.S. Provisional Application No. 62/979,568, entitled "ELECTROCHEMICAL CELLS WITH ELECTRODE MATERIAL COUPLED DIRECTLY TO FILM AND METHODS OF MAKING THE SAME," and filed on Feb. 21, 2020, the disclosure of which is hereby incorporated by reference in its entirety.

STATEMENT REGARDING FEDERALLY SPONSORED RESEARCH OR DEVELOPMENT

This invention was made with government support under Grant Number DE-AR0000774 awarded by the Department of Energy. The government has certain rights in the invention.

TECHNICAL FIELD

Embodiments described herein relate to electrochemical cells with one or more electrodes coupled directly to a film material, and methods of making the same.

BACKGROUND

A battery or an electrochemical cell typically includes an anode material disposed on an anode current collector, a cathode material disposed on a cathode current collector, and a separator disposed between the anode material and the cathode material. Current collectors are often coupled to weld tabs. In some cases, the aforementioned components are disposed in a pouch, with the weld tabs protruding outside of the pouch to act as contact points for charging and discharging of the electrochemical cell. The anode current collector is coupled to a first portion of the pouch and the cathode current collector is coupled to a second portion of the pouch. The use of an anode current collector and a cathode current collector can aid in guiding the flow of electrons into and out of the electrochemical cell. However, current collectors are often manufactured large enough, such that they cover an entire surface of an electrode. This amount of current collector material can incur significant material costs. Large current collectors also do not actively contribute to the energy content of the electrochemical cell, so their mass hampers the specific energy and specific power of the electrochemical cell. The use of a large number of components in an electrochemical cell and interfaces between said components can also cause large resistance overpotential losses in the electrochemical cell. Chemical dissolution of current collectors after repeated cycling can also inhibit electrochemical cell performance. Current collectors can also contribute to metallic contamination of the anode material and/or the cathode material. Current collectors can also corrode, which can hamper energy efficiency of the electrochemical cell. Reducing the size of or substantially eliminating one or more of the current collectors from the electrochemical cell can potentially reduce production costs, improve cell specific energy, improve cell specific power, reduce overpotential losses, improve cycling, and improve overall performance of the electrochemical cell.

SUMMARY

Embodiments described herein relate to electrochemical cells with one or more electrodes coupled directly to a film material, and methods of making the same. In some embodiments, an electrochemical cell includes a first electrode material disposed on a first current collector, wherein the first current collector is coupled to a first non-conductive film. In some embodiments, a first tab is coupled to the first current collector. The electrochemical cell further includes a second electrode material capable of taking up or releasing ions during operation of the electrochemical cell. In some embodiments, the second electrode material can be sufficiently conductive, such that the electrochemical cell can operate normally without the second electrode material being coupled directly to a current collector. In some embodiments, the second electrode material can be sufficiently conductive, such that the electrochemical cell can operate normally without conductive additives being added to the second electrode material. The second electrode material is coupled directly to a second non-conductive film. A second tab is electronically coupled to the second electrode material. A separator is disposed between the first electrode material and the second electrode material. In some embodiments, the second tab can be coupled directly to the second electrode material. In some embodiments, the second tab can be coupled directly to a second current collector and the second current collector can be coupled directly to only a portion of the second electrode material. In some embodiments, the second current collector can physically contact less than about 3% of the total surface area of the second electrode material. In some embodiments, the second electrode material is not coupled to a current collector. In some embodiments, the first non-conductive film can be coupled directly to the second non-conductive film to form a pouch. In some embodiments, the electrochemical cell can have a specific energy of at least about 300 Wh/kg. In some embodiments, the first electrode material and/or the second electrode material can include a semi-solid, binderless electrode material.

DETAILED DESCRIPTION

Figure 1:
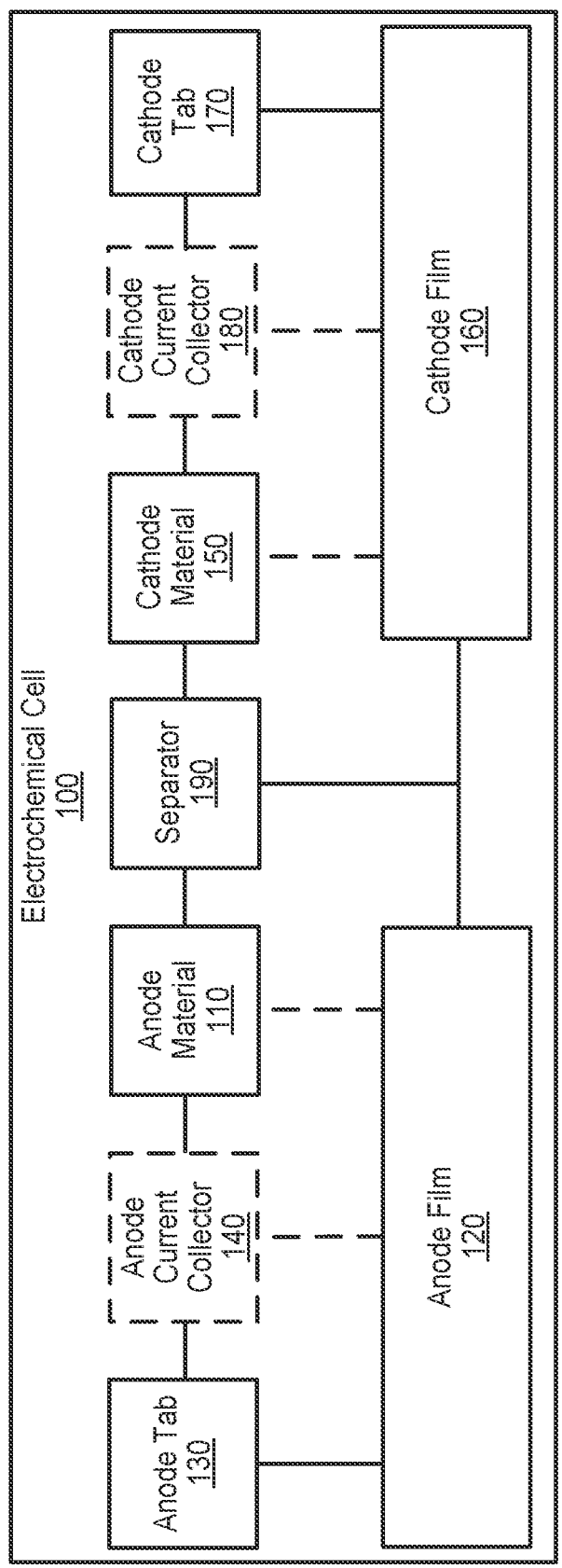
FIG. 1 is a schematic illustration of an electrochemical cell with one or more electrode materials coupled directly to a film material, according to an embodiment

Embodiments described herein relate to electrochemical cells with one or more electrodes coupled directly to a film material, and methods of making the same. More specifically, electrochemical cells with one or more electrodes coupled directly to a film material can reduce the amount of material included in the electrochemical cell by reducing the size of or substantially eliminating a current collector from one or more electrodes in the electrochemical cell. In addition to reducing manufacturing costs, reducing the amount of current collector material included in the electrochemical cell can also increase the specific energy and/or specific power of the electrochemical cell by removing inactive material. Chemical dissolution of current collectors is also a problem that can be mitigated by reducing the size of or substantially eliminating the current collector from one or more electrodes in the electrochemical cell. Additionally, metallic contamination of electrodes via current collectors can be reduced or substantially eliminated in an electrochemical cell with one or more electrodes coupled directly to the film material. Substantially eliminating the current collector from one or more electrodes in the electrochemical cell can also simplify the process of recycling the electrochemical cell.

In some embodiments, the electrochemical cell can include an anode material capable of taking up or releasing ions during operation of the electrochemical cell, the anode material coupled directly to the film material. In some embodiments, a portion of the anode material surface area can be coupled to an anode current collector. In some embodiments, the anode current collector can have a length significantly less than that of the anode material. In some embodiments, the anode current collector can be coupled to an anode tab. In some embodiments, the electrochemical cell can be absent of an anode current collector, and the anode material can be coupled directly to the anode tab. In some embodiments, the anode tab can be an anode weld tab.

In some embodiments, the electrochemical cell can include a cathode material capable of taking up or releasing ions during operation of the electrochemical cell, the cathode material coupled directly to the film material. In some embodiments, a portion of the cathode material surface area can be coupled to a cathode current collector. In some embodiments, the cathode current collector can have a length significantly less than that of the cathode material. In some embodiments, the cathode current collector can be coupled to a cathode tab. In some embodiments, the electrochemical cell can be absent of a cathode current collector, and the cathode material can be coupled directly to the cathode tab. In some embodiments, the cathode tab can be a cathode weld tab.

In some embodiments, the electrochemical cells described herein can include a semi-solid cathode and/or a semi-solid anode. In some embodiments, the semi-solid electrodes described herein can be binderless and/or can use less binder than is typically used in conventional battery manufacturing. The semi-solid electrodes described herein can be formulated as a slurry such that the electrolyte is included in the slurry formulation. This is in contrast to conventional electrodes, for example calendered electrodes, where the electrolyte is generally added to the electrochemical cell once the electrochemical cell has been disposed in a container, for example, a pouch or a can.

In some embodiments, the electrode materials described herein can be a flowable semi-solid or condensed liquid composition. In some embodiments, a flowable semi-solid electrode can include a suspension of an electrochemically active material (anodic or cathodic particles or particulates), and optionally an electronically conductive material (e.g., carbon) in a non-aqueous liquid electrolyte. In some embodiments, the active electrode particles and conductive particles can be co-suspended in an electrolyte to produce a semi-solid electrode. In some embodiments, electrode materials described herein can include conventional electrode materials (e.g., including lithium metal).

Examples of electrodes, electrolyte solutions, and methods that can be used for preparing the same are described in U.S. Pat. No. 9,437,864 (hereafter "the '864 Patent") filed Mar. 10, 2014, entitled "Asymmetric Battery Having a Semi-Solid Cathode and High Energy Density Anode," the entire disclosure of which is incorporated herein by reference in its entirety. Additional examples of electrodes, electrolyte solutions, and methods that can be used for preparing the same are described in U.S. Pat. No. 9,484,569 (hereafter "the '569 Patent"), filed Mar. 15, 2013, entitled "Electrochemical Slurry Compositions and Methods for Preparing the Same," U.S. Pat. No. 10,637,038 (hereafter "the '038 Patent"), filed Nov. 4, 2015, entitled "Electrochemical Cells Having Semi-Solid Electrodes and Methods of Manufacturing the Same," and U.S. Pat. No. 8,993,159 (hereafter "the '159 Patent"), filed Apr. 29, 2013, entitled "Semi-Solid Electrodes Having High Rate Capability," the entire disclosures of which are hereby incorporated by reference herein.

As used in this specification, the singular forms "a," "an," and "the" include plural referents unless the context clearly dictates otherwise. Thus, for example, the term "a member" is intended to mean a single member or a combination of members, "a material" is intended to mean one or more materials, or a combination thereof.

The term "substantially" when used in connection with "cylindrical," "linear," and/or other geometric relationships is intended to convey that the structure so defined is nominally cylindrical, linear or the like. As one example, a portion of a support member that is described as being "substantially linear" is intended to convey that, although linearity of the portion is desirable, some non-linearity can occur in a "substantially linear" portion. Such non-linearity can result from manufacturing tolerances, or other practical considerations (such as, for example, the pressure or force applied to the support member). Thus, a geometric construction modified by the term "substantially" includes such geometric properties within a tolerance of plus or minus 5% of the stated geometric construction. For example, a "substantially linear" portion is a portion that defines an axis or center line that is within plus or minus 5% of being linear.

As used herein, the term "set" and "plurality" can refer to multiple features or a singular feature with multiple parts. For example, when referring to a set of electrodes, the set of electrodes can be considered as one electrode with multiple portions, or the set of electrodes can be considered as multiple, distinct electrodes. Additionally, for example, when referring to a plurality of electrochemical cells, the plurality of electrochemical cells can be considered as multiple, distinct electrochemical cells or as one electrochemical cell with multiple portions. Thus, a set of portions or a plurality of portions may include multiple portions that are either continuous or discontinuous from each other. A plurality of particles or a plurality of materials can also be fabricated from multiple items that are produced separately and are later joined together (e.g., via mixing, an adhesive, or any suitable method).

As used herein, the term "semi-solid" refers to a material that is a mixture of liquid and solid phases, for example, such as a particle suspension, a slurry, a colloidal suspension, an emulsion, a gel, or a micelle.

FIG. 1 is a schematic illustration of an electrochemical cell 100 with one or more electrode materials coupled directly to a film material. The electrochemical cell 100 includes an anode material 110 capable of taking up or releasing ions during operation of the electrochemical cell 100. In some embodiments, the anode material 110 can be coupled directly to an anode film 120 (i.e., the anode material 110 can directly touch the anode film 120). The anode material 110 is electrically coupled to an anode tab 130. In some embodiments, the anode material 110 can be coupled directly to the anode tab 130. In some embodiments, the anode material 110 can be electrically coupled to the anode tab 130 via direct coupling between the anode material 110 an anode current collector 140. In other words, the anode material 110 can be coupled directly to the anode current collector 140 and the anode current collector 140 can be coupled directly to the anode tab 130. The electrochemical cell 100 includes a cathode material 150. In some embodiments, the cathode material 150 can be coupled directly to a cathode film 160. The cathode material 150 is electrically coupled to a cathode tab 170. In some embodiments, the cathode material 150 can be coupled directly to the cathode tab 170. In some embodiments, the cathode material 150 can be electrically coupled to the cathode tab 170 via a cathode current collector 180. In other words, the cathode material 150 can be coupled directly to the cathode current collector 180 and the cathode current collector 180 can be coupled directly to the cathode tab 170. The electrochemical cell 100 further includes a separator 190 disposed between the anode material 110 and the cathode material 150. In some embodiments, the anode film 120 can be coupled directly to the cathode film 160 to form a pouch. In some embodiments, the separator 190 can be coupled directly to the anode film 120 and/or the cathode film 160.

In some embodiments, the anode material 110 can include a conventional electrode material (e.g., lithium metal). In some embodiments, the anode material 110 can in include graphite, lithium metal (Li), sodium metal (Na), silicon oxide (SiO), graphite, silicon, carbon, lithium-intercalated carbon, lithium nitrides, lithium alloys and lithium alloy forming compounds of silicon, bismuth, boron, gallium, indium, zinc, tin, antimony, aluminum, titanium oxide, molybdenum, germanium, manganese, niobium, vanadium, tantalum, gold, platinum, iron, copper, chromium, nickel, cobalt, zirconium, yttrium, molybdenum oxide, germanium oxide, silicon carbide, silicon-graphite composite, or any other anode active material, inclusive of all combinations thereof. In some embodiments, the anode material 110 can include a semi-solid electrode material. In some embodiments, the anode material 110 can include any of the materials of physical characteristics described in the '569 Patent, the '038 Patent, the '159 Patent, and/or the '864 Patent.

In some embodiments, the anode material 110 can be coupled directly to the anode film 120. In some embodiments, the anode material 110 can be deposited on the anode film 120 via sputtering, vapor deposition, sol-gel, physical spray method, electric beam deposition, electrochemical deposition, atomic layer deposition (ALD), chemical vapor deposition (CVD), electrophoretic deposition (EPD), casting, electron beam-induced deposition (EBD), slot-die coating, MICROGRAVURE™ coating, Langmuir-Blodgett film coating, or any other suitable deposition method. In some embodiments, the anode material 110 can be coupled directly to the anode film 120 via an adhesive, a glue, an epoxy, a tube-based epoxy, a two-part epoxy putty, or any other suitable bonding material. In some embodiments, the anode material 110 can be coupled directly to the anode film 120 via a layer of material that can be activated to act as an adhesive under the application of heat, light, such as UV or IR, or mechanical or electrical perturbation, such as ultrasonic or acoustic wave, or radio frequency or microwave, or any combination thereof.

In some embodiments, the anode film 120 can be composed of a non-electronically conductive material. In some embodiments, the anode film 120 can be composed of polyethylene terephthalate (PET), polybutylene terephthalate (PBT), nylon, high-density polyethylene (HDPE), oriented polypropylene (o-PP), polyvinyl chloride (PVC), polyimide (PI), polysulfone (PSU), cast polypropylene (c-PP), polyethylene (PE), ethylene vinylacetate (EVA), PET, Poly-vinyl acetate (PVA), polyamide (PA), acrylic adhesives, ultraviolet (UV)/electron beam (EB)/infrared (IR) curable resin, polyether ether ketone (PEEK), polyethylene naphthalate (PEN), polyethersulfone (PES), Polyimide, (PI), polyphenylene sulfide (PPS), polyphenyleneoxide (PPO), or any combination thereof. In some embodiments, the anode film 120 can have multiple layers. In some embodiments, the anode film 120 can include a first layer composed of a first material and a second layer composed of a second material. In some embodiments, the anode film 120 can include a first layer composed of a first material and a second layer composed of the first material. In some embodiments, the anode film 120 can include 3, 4, 5, 6, 7, 8, 9, 10, or more layers.

In some embodiments, the anode film 120 can have a thickness of at least about 1 nm, at least about 2 nm, at least about 3 nm, at least about 4 nm, at least about 5 nm, at least about 6 nm, at least about 7 nm, at least about 8 nm, at least about 9 nm, at least about 10 nm, at least about 20 nm, at least about 30 nm, at least about 40 nm, at least about 50 nm, at least about 60 nm, at least about 70 nm, at least about 80 nm, at least about 90 nm, at least about 100 nm, at least about 200 nm, at least about 300 nm, at least about 400 nm, at least about 500 nm, at least about 600 nm, at least about 700 nm, at least about 800 nm, at least about 900 nm, at least about 1 µm, at least about 2 µm, at least about 3 µm, at least about 4 µm, at least about 5 µm, at least about 6 µm, at least about 7 µm, at least about 8 µm, at least about 9 µm, at least about 10 µm, at least about 12 µm, at least about 14 µm, at least about 16 µm, at least about 18 µm, at least about 20 µm, at least about 25 µm, at least about 30 µm, at least about 35 µm, at least about 40 µm, at least about 45 µm, at least about 50 µm, at least about 100 µm, at least about 150 µm, or at least about 200 µm. In some embodiments, the anode film 120 can have a thickness of no more than about 250 µm, no more than about 200 µm, no more than about 150 µm, no more than about 100 µm, no more than about 50 µm, no more than about 45 µm, no more than about 40 µm, no more than about 35 µm, no more than about 30 µm, no more than about 25 µm, no more than about 20 µm, no more than about 18 µm, no more than about 16 µm, no more than about 14 µm, no more than about 12 µm, no more than about 10 µm, no more than about 9 µm, no more than about 8 µm, no more than about 7 µm, no more than about 6 µm, no more than about 5 µm, no more than about 4 µm, no more than about 3 µm, no more than about 2 µm, no more than about 1 µm, no more than about 900 nm, no more than about 800 nm, no more than about 700 nm, no more than about 600 nm, no more than about 500 nm, no more than about 400 nm, no more than about 300 nm, no more than about 200 nm, no more than about 100 nm, no more than about 90 nm, no more than about 80 nm, no more than about 70 nm, no more than about 60 nm, no more than about 50 nm, no more than about 40 nm, no more than about 30 nm, no more than about 20 nm, no more than about 10 nm, no more than about 9 nm, no more than about 8 nm, no more than about 7 nm, no more than about 6 nm, no more than about 5 nm, no more than about 4 nm, no more than about 3 nm, or no more than about 2 nm. Combinations of the above-referenced values are also possible for the thickness of the anode film 120 (e.g., at least about 1 nm and no more than about 250 µm or at least about 10 µm and no more than about 50 µm), inclusive of all values and ranges therebetween. In some embodiments, the anode film 120 can have a thickness of about 1 nm, about 2 nm, about 3 nm, about 4 nm, about 5 nm, about 6 nm, about 7 nm, about 8 nm, about 9 nm, about 10 nm, about 20 nm, about 30 nm, about 40 nm, about 50 nm, about 60 nm, about 70 nm, about 80 nm, about 90 nm, about 100 nm, about 200 nm, about 300 nm, about 400 nm, about 500 nm, about 600 nm, about 700 nm, about 800 nm, about 900 nm, about 1 µm, about 2 µm, about 3 µm, about 4 µm, about 5 µm, about 6 µm, about 7 µm, about 8 µm, about 9 µm, about 10 µm, about 12 µm, about 14 µm, about 16 µm, about 18 µm, about 20 µm, about 25 µm, about 30 µm, about 35 µm, about 40 µm, about 45 µm, about 50 µm, about 100 µm, about 150 µm, about 200 µm, or about 250 µm.

In some embodiments, the anode film 120 can have properties the same or substantially similar to those described in U.S. Pat. No. 10,181,587 (hereafter "the '587 Patent") filed Jun. 17, 2016, entitled "Single Pouch Battery Cells and Methods of Manufacture," the entire disclosure of which is hereby incorporated by reference herein.

In some embodiments, the anode tab 130 can include a conductive material in the form of a substrate, sheet, or foil, or any other form factor. In some embodiments, the anode tab 130 can include a metal such as aluminum, copper, lithium, nickel, stainless steel, tantalum, titanium, tungsten, vanadium, or a mixture, combinations or alloys thereof. In some embodiments, the anode tab 130 can include a non-metal material such as carbon, carbon nanotubes, or a metal oxide (e.g., $TiN$, $TiB_2$, $MoSi_2$, $n-BaTiO_3$, $Ti_2O_3$, $ReO_3$, $RuO_2$, $IrO_2$, etc.). In some embodiments, the anode tab 130 can include a conductive coating disposed on any of the aforementioned metal and non-metal materials. In some embodiments, the conductive coating can include a carbon-based material, conductive metal, and/or non-metal material, including composites or layered materials.

In some embodiments, the anode tab 130 can be coupled directly to the anode material 110. In some embodiments, the anode tab 130 can be coupled directly to the anode material 110 via mechanical compression, use of an electrically conductive paste, chemical joining, welding, brazing, soldering, crimping, or any other suitable coupling means.

In some embodiments, the anode current collector 140 can include the same or substantially similar materials to those described above with reference to the anode tab 130. In some embodiments, the anode current collector 140 can have a first material composition and the anode tab 130 can be have a second material composition. In some embodiments, the anode current collector 140 can include the same or substantially similar materials to those described in the '587 patent.

In some embodiments, the anode current collector 140 can be coupled directly to the anode material 110. In some embodiments, the anode current collector 140 can be coupled directly to the anode tab 130. In some embodiments, the anode current collector 140 can be a thin strip of electrically conductive material coupling the anode material 110 and the anode tab 130. In some embodiments, the anode current collector 140 can be coupled directly to the anode material 110 via mechanical compression, use of an electrically conductive paste, chemical joining, welding, brazing, soldering, crimping, or any other suitable coupling means.

In some embodiments, the anode current collector 140 can be coupled directly to the anode tab 130 via mechanical compression, use of an electrically conductive paste, chemical joining, welding, brazing, soldering, crimping, or any other suitable coupling means. In some embodiments, the anode current collector 140 can have properties the same or substantially similar to those described in the '587 patent.

In some embodiments, the cathode material 150 can include Lithium cobalt oxide (LCO), lithium nickel manganese cobalt oxide (NMC), lithium iron phosphate (LFP), or any other cathode active material, inclusive of all combinations thereof.

In some embodiments, the cathode material 150 can be coupled directly to the cathode film 160. In some embodiments, the coupling between the cathode material 150 and the cathode film 160 can be the same or substantially similar to the coupling between the anode material 110 and the anode film 120, as described above. In some embodiments, the anode material 110 can be coupled directly to the anode film 120, while the cathode material 150 is not coupled directly to the cathode film 160. In some embodiments, the cathode material 150 can be coupled directly to the cathode film 160 while the anode material 110 is not coupled directly to the anode film 120. In some embodiments, both the anode material 110 can be coupled directly to the anode film 120 and the cathode material 150 can be coupled directly to the cathode film 160. In some embodiments, the cathode film 160 can have properties the same or substantially similar to the properties of the anode film 120, as described above.

In some embodiments, the cathode tab 170 can include a conductive material in the form of a substrate, sheet, or foil, or any other form factor. In some embodiments, the cathode tab 170 can include a metal such as aluminum, copper, lithium, nickel, stainless steel, tantalum, titanium, tungsten, vanadium, or a mixture, combinations or alloys thereof. In some embodiments, the cathode tab 170 can include a non-metal material such as carbon, carbon nanotubes, or a metal oxide (e.g., $TiN$, $TiB_2$, $MoSi_2$, $n-BaTiO_3$, $Ti_2O_3$, $ReO_3$, $RuO_2$, $IrO_2$, etc.). In some embodiments, the cathode tab 170 can include a conductive coating disposed on any of the aforementioned metal and non-metal materials. In some embodiments, the conductive coating can include a carbon-based material, conductive metal, and/or non-metal material, including composites or layered materials.

In some embodiments, the cathode current collector 180 can include the same or substantially similar materials to those described above with reference to the cathode tab 170. In some embodiments, the cathode current collector 180 can have a first material composition and the cathode tab 170 can be have a second material composition. In some embodiments, the cathode current collector 180 can include the same or substantially similar materials to those described in the '587 patent.

In some embodiments, the cathode current collector 180 can be coupled directly to the cathode material 150. In some embodiments, the coupling between the cathode current collector 180 and the cathode material 150 can be the same or substantially similar to the coupling between the anode current collector 140 and the anode material 110, as described above. In some embodiments, the cathode current collector 180 can be coupled directly to the cathode tab 170. In some embodiments, the coupling between the cathode current collector 180 and the cathode tab 170 can be the same or substantially similar to the coupling between the anode current collector 140 and the anode tab 130, as described above. In some embodiments, the cathode current collector 180 can have properties the same or substantially similar to those described in the '587 patent.

In some embodiments, the separator 190 can be a thin, microporous membrane that electrically separates the anode material 110 from the cathode material 150 but allows ions to pass through the pores between the anode material 110 and the cathode material 150. In some embodiments, the separator 190 can be coupled directly to the anode film 120 and/or the cathode film 160. In some embodiments, the separator 190 can have properties the same or substantially similar to those described in the '587 patent.

In some embodiments, the electrochemical cell 100 can include one or more electrolyte solutions. Electrolyte solutions can include ethylene carbonate (EC), gamma-butyrolactone (GBL), Lithium bis(fluorosulfonyl) imide (LiFSI), trioctyl phosphate (TOP), propylene carbonate (PC), dimethoxyethane (DME), bis(trifluoromethanesulfonyl)imide (TSFI), $Li_{1.4}Al_{0.4}Ti_{1.6}(PO_4)_3$ (LATP), and any combinations thereof. Additional examples of active materials, conductive materials, and electrolyte solutions that can be incorporated in the electrochemical cell 100 are described in the '569 patent.

In some embodiments, the electrochemical cell 100 can have a cell specific power output of at least about 300 W/kg, at least about 350 W/kg, at least about 400 W/kg, at least about 450 W/kg, at least about 500 W/kg, at least about 550 W/kg, at least about 600 W/kg, or at least about 650 W/kg, or at least about 700 W/kg, inclusive of all values and ranges therebetween.

In some embodiments, the electrochemical cell 100 can have a cell specific energy density of at least about 250 W·h/kg when discharged at 1 C, at least about 300 W·h/kg when discharged at 1 C, at least about 350 W·h/kg when discharged at 1 C, at least about 400 W·h/kg when discharged at 1 C, at least about 450 W·h/kg, at least about 500 W·h/kg, at least about 550 W·h/kg, at least about 600 W·h/kg, at least about 650 W·h/kg, at least about 700 W·h/kg, or at least about 750 W·h/kg when discharged at 1 C, inclusive of all values and ranges therebetween In some embodiments, the electrochemical cell 100 can have a cell specific energy density of at least about 250 W·h/kg when discharged at C/2, at least about 300 W·h/kg when discharged at C/2, at least about 350 W·h/kg when discharged at C/2, at least about 400 W·h/kg when discharged at C/2, at least about 450 W·h/kg, at least about 500 W·h/kg, at least about 550 W·h/kg, at least about 600 W·h/kg, at least about 650 W·h/kg, at least about 700 W·h/kg, or at least about 750 W·h/kg when discharged at C/2, inclusive of all values and ranges therebetween In some embodiments, the electrochemical cell 100 can have a cell specific energy density of at least about 250 W·h/kg when discharged at C/4, at least about 300 W·h/kg when discharged at C/4, at least about 350 W·h/kg when discharged at C/4, at least about 400 W·h/kg when discharged at C/4, or at least about 450 W·h/kg, at least about 500 W·h/kg, at least about 550 W·h/kg, at least about 600 W·h/kg, at least about 650 W·h/kg, at least about 700 W·h/kg, or at least about 750 W·h/kg when discharged at C/4, inclusive of all values and ranges therebetween.

In some embodiments, the percentage of energy lost from the electrochemical cell 100 due to resistance overpotential can be less than about 40% when discharged at 1 C, less than about 35% when discharged at 1 C, less than about 30% when discharged at 1 C, less than about 25% when discharged at 1 C, less than about 20% when discharged at 1 C, less than about 18% when discharged at 1 C, less than about 16% when discharged at 1 C, less than about 14% when discharged at 1 C, less than about 12% when discharged at 1 C, less than about 10% when discharged at 1 C, less than about 9% when discharged at 1 C, less than about 8% when discharged at 1 C, less than about 7% when discharged at 1 C, less than about 6% when discharged at 1 C, less than about 5% when discharged at 1 C, less than about 4% when discharged at 1 C, less than about 3% when discharged at 1 C, less than about 2% when discharged at 1 C, or less than about 1% when discharged at 1 C, inclusive of all values and ranges therebetween. In some embodiments, the percentage of energy lost from the electrochemical cell 100 due to resistance overpotential can be less than about 40% when discharged at C/2, less than about 35% when discharged at C/2, less than about 30% when discharged at C/2, less than about 25% when discharged at C/2, less than about 20% when discharged at C/2, less than about 18% when discharged at C/2, less than about 16% when discharged at C/2, less than about 14% when discharged at C/2, less than about 12% when discharged at C/2, less than about 10% when discharged at C/2, less than about 9% when discharged at C/2, less than about 8% when discharged at C/2, less than about 7% when discharged at C/2, less than about 6% when discharged at C/2, less than about 5% when discharged at C/2, less than about 4% when discharged at C/2, less than about 3% when discharged at C/2, less than about 2% when discharged at C/2, or less than about 1% when discharged at C/2, inclusive of all values and ranges therebetween. In some embodiments, the percentage of energy lost from the electrochemical cell 100 due to resistance overpotential can be less than about 40% when discharged at C/4, less than about 35% when discharged at C/4, less than about 30% when discharged at C/4, less than about 25% when discharged at C/4, less than about 20% when discharged at C/4, less than about 18% when discharged at C/4, less than about 16% when discharged at C/4, less than about 14% when discharged at C/4, less than about 12% when discharged at C/4, less than about 10% when discharged at C/4, less than about 9% when discharged at C/4, less than about 8% when discharged at C/4, less than about 7% when discharged at C/4, less than about 6% when discharged at C/4, less than about 5% when discharged at C/4, less than about 4% when discharged at C/4, less than about 3% when discharged at C/4, less than about 2% when discharged at C/4, or less than about 1% when discharged at C/4, inclusive of all values and ranges therebetween.

Figure 2:
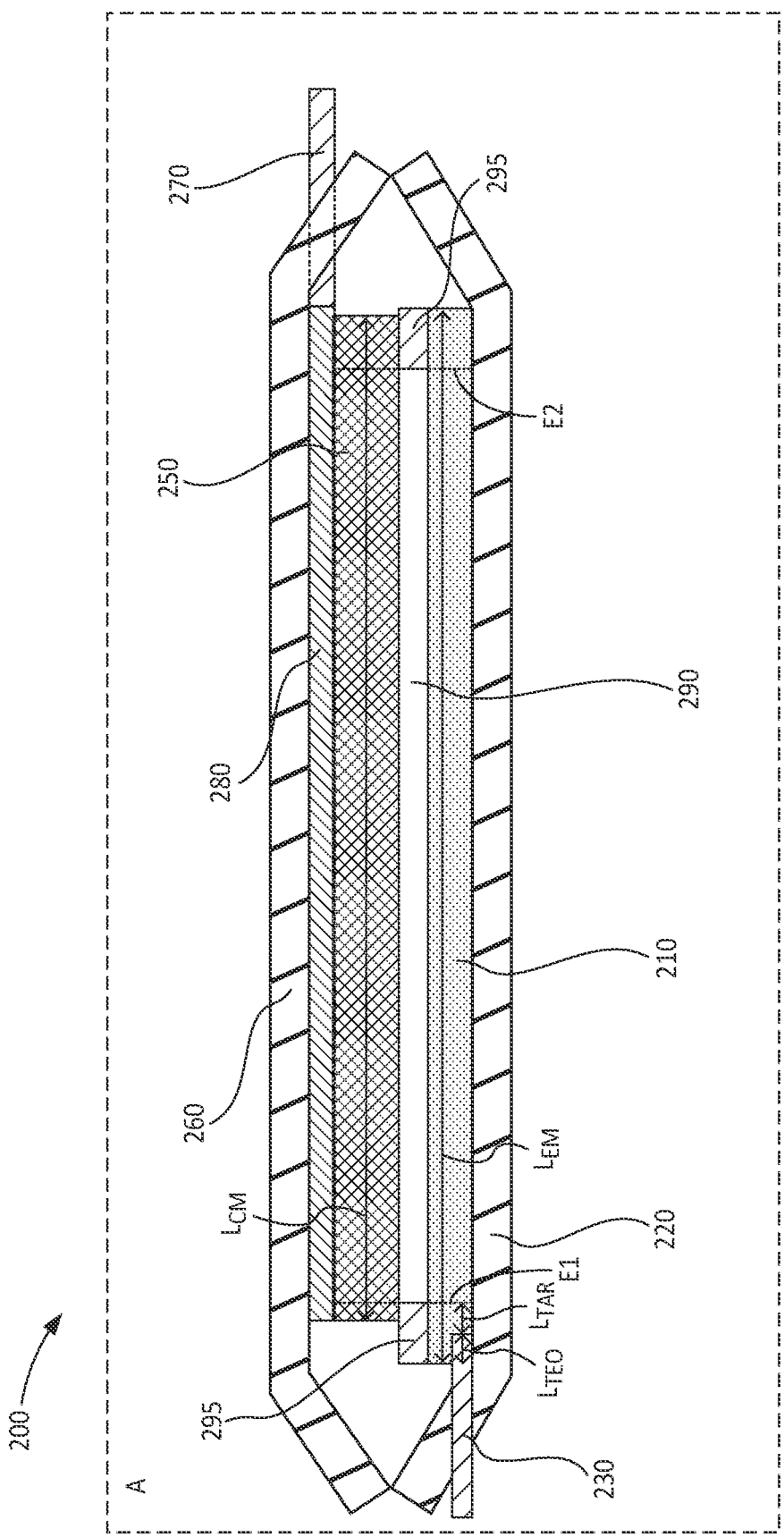
FIG. 2 illustrates an electrochemical cell with an anode coupled directly to a film, according to an embodiment.
Figure 3:
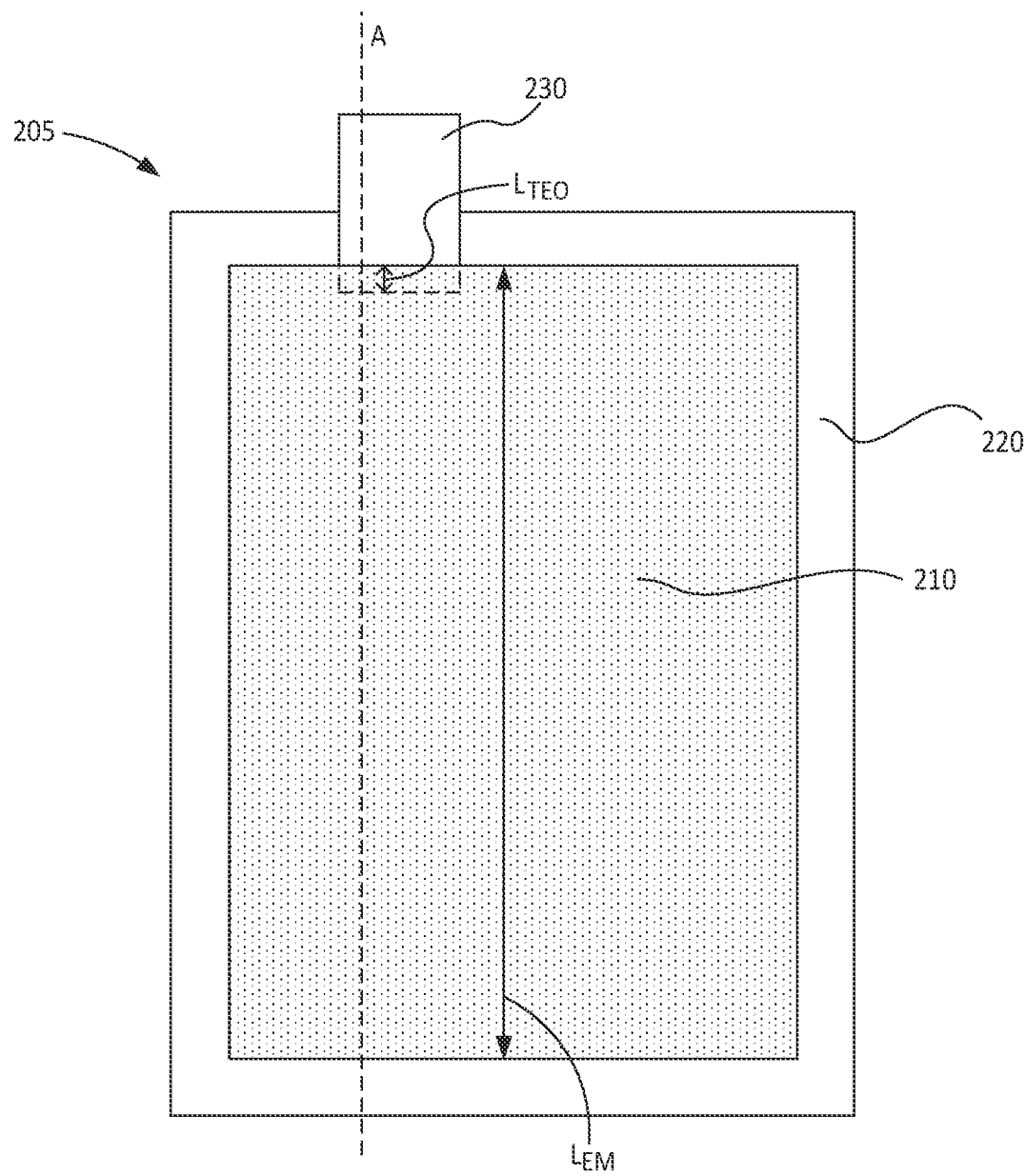
FIG. 3 illustrates an anode coupled directly to a film, according to an embodiment.

FIGS. 2 and 3 show perspective views of an electrochemical cell 200 and an anode 205, according to various embodiments. The electrochemical cell 200 includes an anode material 210 capable of taking up or releasing ions during operation of the electrochemical cell 200. As shown, the anode material 210 is coupled directly to an anode film 220. As shown, the anode material 210 is coupled directly to the anode tab 230. In some embodiments, the anode material 210 can be electrically coupled to the anode tab 230 via an anode current collector (not shown). The electrochemical cell 200 includes a cathode material 250. As shown, the cathode material 250 is coupled directly to a cathode current collector 280. As shown, the cathode current collector 280 is coupled directly to a cathode film 260 and a cathode tab 270. In some embodiments, the cathode material 250 can be coupled directly to the cathode film 260. In some embodiments, the cathode material 250 can be coupled directly to the cathode tab 270. The electrochemical cell 200 further includes a separator 290 disposed between the anode material 210 and the cathode material 250. In some embodiments, the anode film 220 can be coupled directly to the cathode film 260 to form a pouch. In some embodiments, the separator 290 can be coupled directly to the anode film 220 and/or the cathode film 260. FIG. 2 shows a cross-sectional view of the electrochemical cell 200 along surface A, wherein surface A is oriented through the anode tab 230. FIG. 3 shows an overhead view of the anode 205, wherein surface A appears as a line. As shown from the perspective of FIG. 2, the cathode tab 270 is oriented behind the anode tab 230. In other words, surface A is shown oriented through the anode tab 230 but not the cathode tab 270. In some embodiments, the cathode tab 270 can be oriented in line with the anode tab 230, such that surface A is oriented through the anode tab 230 and the cathode tab 270.

In some embodiments, the anode material 210, the anode film 220, the anode tab 230, the cathode material 250, the cathode film 260, the cathode tab 270, the cathode current collector 280, the separator 290, and the couplings therebetween, can be the same or substantially similar to the anode material 110, the anode film 120, the anode tab 130, the cathode material 150, the cathode film 160, the cathode tab 170, the cathode current collector 180, the separator 190, and the couplings therebetween, respectively, as described above with reference to FIG. 1.

An electrochemical cell design, wherein one or more of the electrodes does not include a conventional current collector (as shown in FIG. 2 and FIG. 3), can enable several technical advantages. First, material costs, specifically for current collector materials, can be reduced by at least 50%. Secondly, resistance overpotential losses can be significantly reduced, when compared to resistance overpotential losses in an electrochemical cell, wherein both electrodes include a conventional current collector. Thirdly, the construction of each electrochemical cell can be simplified, in that there are fewer components to include in the assembly. Fourthly, deconstruction is simplified for easy recycling in an electrochemical cell, wherein one or more of the electrodes does not include a conventional current collector.

As shown in FIG. 2 and FIG. 3, the anode material 210 has a characteristic electrode material length $L_{EM}$. Also shown in FIG. 3, a portion of the anode tab 230 overlaps a portion of the anode material 210. This overlap section has a characteristic tab-electrode overlap length $L_{TEO}$. In some embodiments, $L_{TEO}$ can be at least about 1 µm, at least about 5 µm, at least about 10 µm, at least about 20 µm, at least about 30 µm, at least about 40 µm, at least about 50 µm, at least about 60 µm, at least about 70 µm, at least about 80 µm, at least about 90 µm, at least about 100 µm, at least about 200 µm, at least about 300 µm, at least about 400 µm, at least about 500 µm, at least about 600 µm, at least about 700 µm, at least about 800 µm, at least about 900 µm, at least about 1 mm, at least about 2 mm, at least about 3 mm, at least about 4 mm, at least about 5 mm, at least about 6 mm, at least about 7 mm, at least about 8 mm, at least about 9 mm, at least about 1 cm, at least about 2 cm, at least about 3 cm, or at least about 4 cm. In some embodiments, $L_{TEO}$ can be no more than about 5 cm, no more than about 4 cm, no more than about 3 cm, no more than about 2 cm, no more than about 1 cm, no more than about 9 mm, no more than about 8 mm, no more than about 7 mm, no more than about 6 mm, no more than about 5 mm, no more than about 4 mm, no more than about 3 mm, no more than about 2 mm, no more than about 1 mm, no more than about 900 µm, no more than about 800 µm, no more than about 700 µm, no more than about 600 µm, no more than about 500 µm, no more than about 400 µm, no more than about 300 µm, no more than about 200 µm, no more than about 100 µm, no more than about 90 µm, no more than about 80 µm, no more than about 70 µm, no more than about 60 µm, no more than about 50 µm, no more than about 40 µm, no more than about 30 µm, no more than about 20 µm, no more than about 10 µm, no more than about 9 µm, no more than about 8 µm, no more than about 7 µm, no more than about 6 µm, no more than about 5 µm, no more than about 4 µm, no more than about 3 µm, or no more than about 2 µm. Combinations of the above-referenced values are also possible for $L_{TEO}$ (e.g., at least about 1 µm and no more than about 5 cm or at least about 10 µm and no more than about 50 µm), inclusive of all values and ranges therebetween. In some embodiments, $L_{TEO}$ can be about 1 µm, about 2 µm, about 3 µm, about 4 µm, about 5 µm, about 6 µm, about 7 µm, about 8 µm, about 9 µm, about 10 µm, about 20 µm, about 30 µm, about 40 µm, about 50 µm, about 60 µm, about 70 µm, about 80 µm, about 90 µm, about 100 µm, about 200 µm, about 300 µm, about 400 µm, about 500 µm, about 600 µm, about 700 µm, about 800 µm, about 900 µm, about 1 mm, about 2 mm, about 3 mm, about 4 mm, about 5 mm, about 6 mm, about 7 mm, about 8 mm, about 9 mm, about 1 cm, about 2 cm, about 3 cm, about 4 cm, or about 5 cm. In some embodiments, the anode 205 can have no or substantially no tab-electrode overlap (i.e., $L_{TEO}$ can be about 0 µm).

In some embodiments, the ratio of $L_{TEO}:L_{EM}$ can be at least about 1:1000, at least about 1:900, at least about 1:900, at least about 1:800, at least about 1:700, at least about 1:600, at least about 1:500, at least about 1:400, at least about 1:300, at least about 1:200, at least about 1:100, at least about 1:90, at least about 1:80, at least about 1:70, at least about 1:60, at least about 1:50, at least about 1:40, at least about 1:30, at least about 1:20, at least about 1:10, at least about 1:9, at least about 1:8, at least about 1:7, at least about 1:6, at least about 1:5, at least about 1:4, at least about 1:3, at least about 1:2, at least about 1:1.9, at least about 1:1.8, at least about 1:1.7, or at least about 1:1.6. In some embodiments, the ratio of $L_{TEO}:L_{EM}$ can be no more than about 1:1.5, no more than about 1:1.6, no more than about 1:1.7, no more than about 1:1.8, no more than about 1:1.9, no more than about 1:2, no more than about 1:3, no more than about 1:4, no more than about 1:5, no more than about 1:6, no more than about 1:7, no more than about 1:8, no more than about 1:9, no more than about 1:10, no more than about 1:20, no more than about 1:30, no more than about 1:40, no more than about 1:50, no more than about 1:60, no more than about 1:70, no more than about 1:80, no more than about 1:90, no more than about 1:100, no more than about 1:200, no more than about 1:300, no more than about 1:400, no more than about 1:500, no more than about 1:600, no more than about 1:700, no more than about 1:800, or no more than about 1:900. Combinations of the above-referenced values are also possible for the ratio of $L_{TEO}:L_{EM}$ (e.g., at least about 1:1000 and no more than about 1:1.5 or at least about 1:100 and no more than about 1:50), inclusive of all values and ranges therebetween. In some embodiments, the ratio of $L_{TEO}:L_{EM}$ can be about 1:1000, about 1:900, about 1:800, about 1:700, about 1:600, about 1:500, about 1:400, about 1:300, about 1:200, about 1:100, about 1:90, about 1:80, about 1:70, about 1:60, about 1:50, about 1:40, about 1:30, about 1:20, about 1:10, about 1:9, about 1:8, about 1:7, about 1:6, about 1:5, about 1:4, about 1:3, about 1:2, about 1:1.9, about 1:1.8, about 1:1.7, about 1:1.6, or about 1:1.5.

In some embodiments, the cathode material 250 can have a characteristic length $L_{CM}$. In some embodiments, $L_{CM}$ can be the same or substantially similar to $L_{EM}$. In some embodiments, $L_{CM}$ can be less than $L_{EM}$. In some embodiments, $(L_{EM}-L_{CM})$ can be at least about 1 µm, at least about 5 µm, at least about 10 µm, at least about 50 µm, at least about 100 µm, at least about 500 µm, at least about 1 mm, at least about 5 mm, at least about 1 cm, or at least about 5 cm. In some embodiments, ($L_{EM}$-$L_{CM}$) can be no more than about 10 cm, no more than about 5 cm, no more than about 1 cm, no more than about 5 mm, no more than about 1 mm, no more than about 500 µm, no more than about 100 µm, no more than about 50 µm, no more than about 10 µm, or no more than about 5 µm. Combinations of the above-referenced values are also possible for ($L_{EM}$-$L_{CM}$) (e.g., at least about 1 µm and no more than about 10 cm or at least about 10 mm and no more than about 1 cm), inclusive of all values and ranges therebetween. In some embodiments, ($L_{EM}$-$L_{CM}$) can be about 1 µm, about 5 µm, about 10 µm, about 50 µm, about 100 µm, about 500 µm, about 1 mm, about 5 mm, about 1 cm, about 5 cm, or about 10 cm.

Plating of electroactive materials around a perimeter of the anode material 210 and/or the cathode material 250 is a problem that can occur when the dimensions of the anode material 210 and the cathode material 250 do not match. In such a cell design, as electroactive material flows between the anode material 210 and the cathode material 250, and deposits or plates of electroactive species can develop around the outside perimeter of the anode material 210 and/or the cathode material. These deposits can potentially cause short circuits in the electrochemical cell 200. In some embodiments, the separator 290 can include a separator seal 295 that can restrict the flow paths of ions through the separator 290. The restriction of flow paths through the separator 290 can guide the flow path of the ions, such that the ions go into the anode material 210 and/or the cathode material 250, and do not become deposited around the outside perimeter of the anode material 210 and/or the cathode material 250. In some embodiments, the separator seal 295 can be a tape or an adhesive material adhered to the outside surface of the separator 290. In some embodiments, the separator seal 295 can be melted together with the separator 290 such that the separator 290 and the separator seal 295 are thermally bonded together. In some embodiments, the separator seal 295 can be a gel, a high viscosity oil, and/or a material that permeates into the pores of portions of the separator 290, thereby blocking the flow of materials through those pores.

As shown in FIG. 2, the separator seal 295 defines a first edge E1 and a second edge E2 of an active region of the anode material 210 and the cathode material 250. The active region of the anode material 210 and the cathode material 250 is a region, in which ions can move freely between the anode material 210 and the cathode material 250. As shown, the separator seal 295 prevents or substantially inhibits movement of ions through the portion of the separator 290 with the separator seal 290. In some embodiments, in which the separator 290 does not include a separator seal 295, the first edge E1 and the second edge E2 of the active region can be defined by the outer edges of the cathode material 250 (when $L_{CM}$ is less than $L_{EM}$). In some embodiments, in which the separator 290 does not include a separator seal 295, the first edge E1 and the second edge E2 of the active region can be defined by the outer edges of the anode material 210 (when $L_{EM}$ is less than $L_{CM}$). As shown, the anode tab 230 does not extend into the active region of the anode material 210. Keeping the anode tab 230 out of the active region of the anode material 210 can prevent plating of electroactive material on the anode tab 230 and can prevent short circuits.

In some embodiments, the electrochemical cell 200 can have a characteristic tab-active region length $L_{TAR}$, defined as the minimum distance between the edge of the anode tab 230 and the first edge E1 of the active region of the anode material 210. In some embodiments, $L_{TAR}$ can be at least about 1 µm, at least about 5 µm, at least about 10 µm, at least about 20 µm, at least about 30 µm, at least about 40 µm, at least about 50 µm, at least about 60 µm, at least about 70 µm, at least about 80 µm, at least about 90 µm, at least about 100 µm, at least about 200 µm, at least about 300 µm, at least about 400 µm, at least about 500 µm, at least about 600 µm, at least about 700 µm, at least about 800 µm, at least about 900 µm, at least about 1 mm, at least about 2 mm, at least about 3 mm, at least about 4 mm, at least about 5 mm, at least about 6 mm, at least about 7 mm, at least about 8 mm, at least about 9 mm, at least about 1 cm, at least about 2 cm, at least about 3 cm, or at least about 4 cm. In some embodiments, $L_{TAR}$ can be no more than about 5 cm, no more than about 4 cm, no more than about 3 cm, no more than about 2 cm, no more than about 1 cm, no more than about 9 mm, no more than about 8 mm, no more than about 7 mm, no more than about 6 mm, no more than about 5 mm, no more than about 4 mm, no more than about 3 mm, no more than about 2 mm, no more than about 1 mm, no more than about 900 µm, no more than about 800 µm, no more than about 700 µm, no more than about 600 µm, no more than about 500 µm, no more than about 400 µm, no more than about 300 µm, no more than about 200 µm, no more than about 100 µm, no more than about 90 µm, no more than about 80 µm, no more than about 70 µm, no more than about 60 µm, no more than about 50 µm, no more than about 40 µm, no more than about 30 µm, no more than about 20 µm, no more than about 10 µm, no more than about 9 µm, no more than about 8 µm, no more than about 7 µm, no more than about 6 µm, no more than about 5 µm, no more than about 4 µm, no more than about 3 µm, or no more than about 2 µm. Combinations of the above-referenced values are also possible for $L_{TAR}$ (e.g., at least about 1 µm and no more than about 5 cm or at least about 10 µm and no more than about 50 µm), inclusive of all values and ranges therebetween. In some embodiments, $L_{TAR}$ can be about 1 µm, about 2 µm, about 3 µm, about 4 µm, about 5 µm, about 6 µm, about 7 µm, about 8 µm, about 9 µm, about 10 µm, about 20 µm, about 30 µm, about 40 µm, about 50 µm, about 60 µm, about 70 µm, about 80 µm, about 90 µm, about 100 µm, about 200 µm, about 300 µm, about 400 µm, about 500 µm, about 600 µm, about 700 µm, about 800 µm, about 900 µm, about 1 mm, about 2 mm, about 3 mm, about 4 mm, about 5 mm, about 6 mm, about 7 mm, about 8 mm, about 9 mm, about 1 cm, about 2 cm, about 3 cm, about 4 cm, or about 5 cm.

In some embodiments, the ratio of $L_{TAR}$:$L_{EM}$ can be at least about 1:1000, at least about 1:900, at least about 1:900, at least about 1:800, at least about 1:700, at least about 1:600, at least about 1:500, at least about 1:400, at least about 1:300, at least about 1:200, at least about 1:100, at least about 1:90, at least about 1:80, at least about 1:70, at least about 1:60, at least about 1:50, at least about 1:40, at least about 1:30, at least about 1:20, at least about 1:10, at least about 1:9, at least about 1:8, at least about 1:7, at least about 1:6, at least about 1:5, at least about 1:4, at least about 1:3, at least about 1:2, at least about 1:1.9, at least about 1:1.8, at least about 1:1.7, or at least about 1:1.6. In some embodiments, the ratio of $L_{TAR}$:$L_{EM}$ can be no more than about 1:1.5, no more than about 1:1.6, no more than about 1:1.7, no more than about 1:1.8, no more than about 1:1.9, no more than about 1:2, no more than about 1:3, no more than about 1:4, no more than about 1:5, no more than about 1:6, no more than about 1:7, no more than about 1:8, no more than about 1:9, no more than about 1:10, no more than about 1:20, no more than about 1:30, no more than about 1:40, no more than about 1:50, no more than about 1:60, no more than about 1:70, no more than about 1:80, no more than about 1:90, no more than about 1:100, no more than about 1:200, no more than about 1:300, no more than about 1:400, no more than about 1:500, no more than about 1:600, no more than about 1:700, no more than about 1:800, or no more than about 1:900. Combinations of the above-referenced values are also possible for the ratio of $L_{TAR}$:$L_{EM}$ (e.g., at least about 1:1000 and no more than about 1:1.5 or at least about 1:100 and no more than about 1:50), inclusive of all values and ranges therebetween. In some embodiments, the ratio of $L_{TAR}$:$L_{EM}$ can be about 1:1000, about 1:900, about 1:800, about 1:700, about 1:600, about 1:500, about 1:400, about 1:300, about 1:200, about 1:100, about 1:90, about 1:80, about 1:70, about 1:60, about 1:50, about 1:40, about 1:30, about 1:20, about 1:10, about 1:9, about 1:8, about 1:7, about 1:6, about 1:5, about 1:4, about 1:3, about 1:2, about 1:1.9, about 1:1.8, about 1:1.7, about 1:1.6, or about 1:1.5.

As shown, the anode tab 230 is disposed between the anode material 210 and the anode film 220 (i.e., on the underside of the anode material 210 when viewed from the perspective of FIG. 3). In some embodiments, the anode tab 230 can be disposed between the anode material 210 and the separator 290 (i.e., on the top side of the anode material 210 when viewed from the perspective of FIG. 3). As shown, the anode material 210 is disposed on a single side of the anode tab 230. In some embodiments, a second portion of the anode material 210 can be disposed on the anode tab 230, such that both sides of the anode tab 230 are coupled directly to portions of the anode material 210.

As shown, the anode material 210 is coupled directly to the anode film 220 and the electrochemical cell 200 does not include an anode current collector. In some embodiments, the cathode material 250 can be coupled directly to the cathode film 260 and the electrochemical cell 200 can be absent of a cathode current collector. In some embodiments, the anode material 210 can be coupled directly to the anode film 220, the cathode material 250 can be coupled directly to the cathode film 260, and the electrochemical cell 200 can be absent of an anode current collector and a cathode current collector. In some embodiments, the electrochemical cell 200 can be absent of a cathode current collector, and the $L_{TEO}$ values, $L_{TAR}$ values, $L_{TEO}$:$L_{EM}$ ratios, and $L_{TAR}$:$L_{EM}$ ratios applied to the cathode can be the same or substantially similar to the $L_{TEO}$ values, $L_{TAR}$ values, $L_{TEO}$:$L_{EM}$ ratios, and $L_{TAR}$:$L_{EM}$ ratios as described above with reference to the anode 205.

Figure 4:
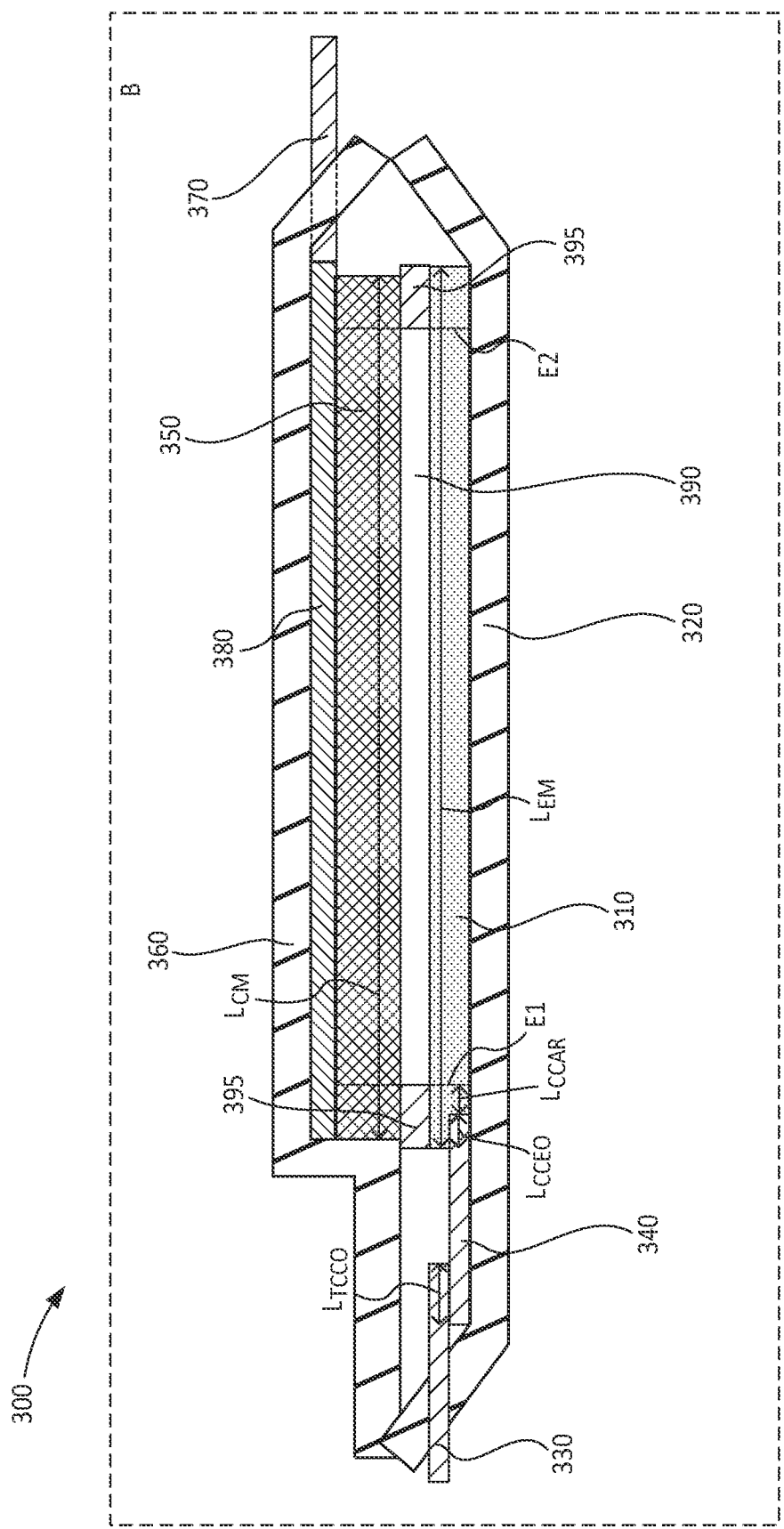
FIG. 4 illustrates an electrochemical cell with an anode coupled directly to a film, according to an embodiment.
Figure 5:
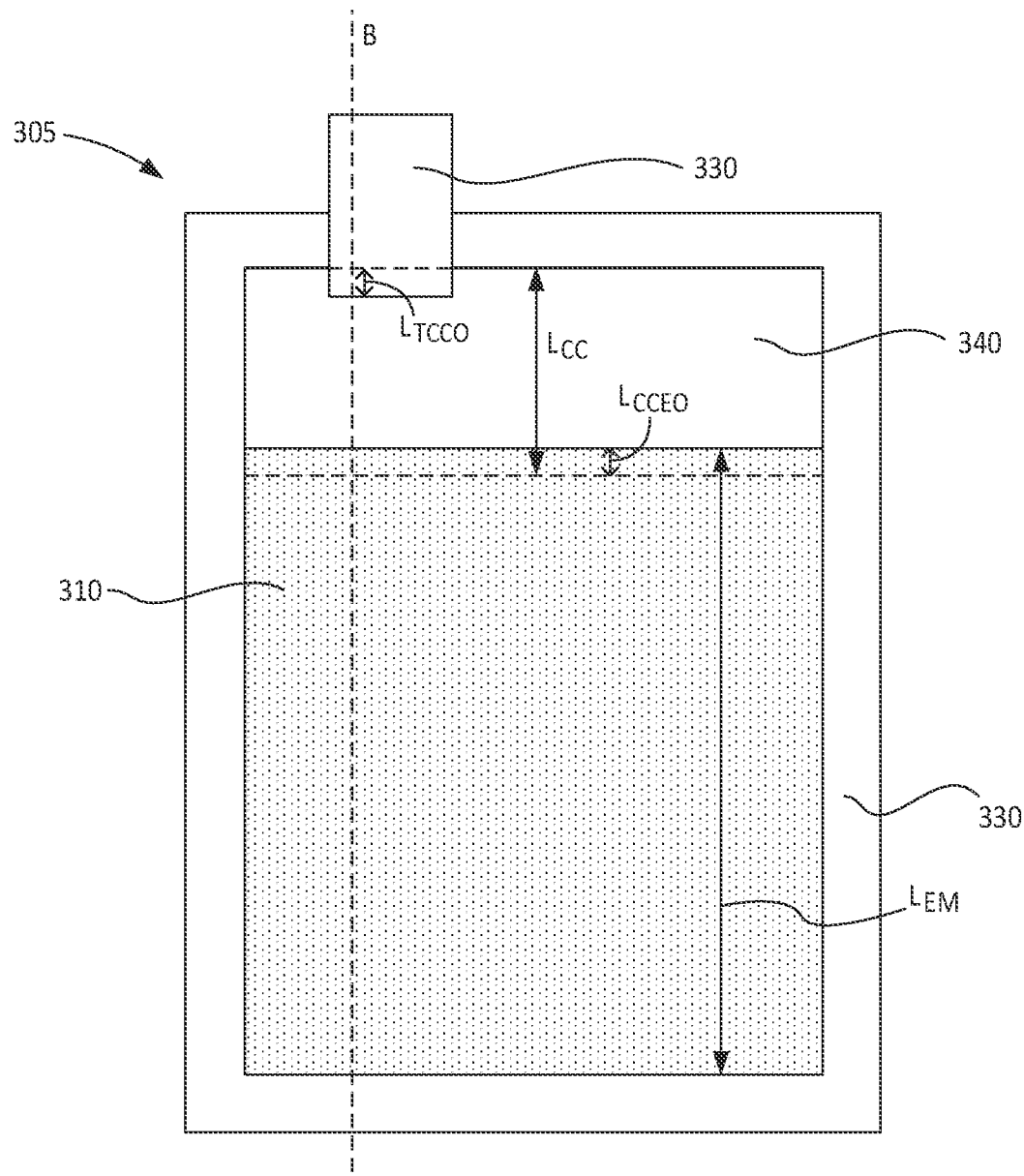
FIG. 5 illustrates an anode coupled directly to a film, according to an embodiment.

FIGS. 4 and 5 show perspective views of an electrochemical cell 300 and an anode 305, according to various embodiments. The electrochemical cell 300 includes an anode material 310 capable of taking up or releasing ions during operation of the electrochemical cell 300. As shown, the anode material 310 is coupled directly to an anode film 320, the anode material 310 is coupled directly to an anode current collector 340, and the anode current collector 340 is coupled directly to an anode tab 330. The electrochemical cell 300 includes a cathode material 350. As shown, the cathode material 350 is coupled directly to a cathode current collector 380 and the cathode current collector 380 is coupled directly to a cathode film 360 and a cathode tab 370. In some embodiments, the cathode material 350 can be coupled directly to the cathode film 360. The electrochemical cell 300 further includes a separator 390 disposed between the anode material 310 and the cathode material 350. In some embodiments, the anode film 320 can be coupled directly to the cathode film 360 to form a pouch. In some embodiments, the separator 390 can be coupled directly to the anode film 320 and/or the cathode film 360.

FIG. 4 shows a cross-sectional view of the electrochemical cell 300 along surface B, wherein surface B is oriented through the anode tab 330. FIG. 5 shows an overhead view of the anode 305, wherein surface B appears as a line. As shown from the perspective of FIG. 4, the cathode tab 370 is oriented behind the anode tab 330. In other words, surface B is shown oriented through the anode tab 330 but not the cathode tab 370. In some embodiments, the cathode tab 370 can be oriented in line with the anode tab 330, such that surface B is oriented through the anode tab 330 and the cathode tab 370.

In some embodiments, the anode material 310, the anode film 320, the anode tab 330, the anode current collector 340, the cathode material 350, the cathode film 360, the cathode tab 370, the cathode current collector 380, the separator 390, and the couplings therebetween, can be the same or substantially similar to the anode material 110, the anode film 120, the anode tab 130, the anode current collector 140, the cathode material 150, the cathode film 160, the cathode tab 170, the cathode current collector 180, the separator 190, and the couplings therebetween, respectively, as described above with reference to FIG. 1.

An electrochemical cell design, wherein one or more of the electrodes includes a current collector smaller than a conventional current collector (as shown in FIG. 4 and FIG. 5), can enable several technical advantages. First, material costs, specifically for current collector materials, can be reduced by at least 25%. Secondly, conventional coupling methods for the coupling between electrode material and current collector and the coupling between current collector and tab can be used in such a design. Thirdly, safety can be improved in such an electrochemical cell, as the maximum amount of current that can pass through the current collector is reduced, compared to an electrochemical cell with a current collector. This can minimize instances of thermal runaway in the event of an external short circuit.

As shown in FIG. 4 and FIG. 5, the anode material 310 has a characteristic electrode material length $L_{EM}$. In some embodiments, the value of $L_{EM}$ can be the same or substantially similar to the value of $L_{EM}$ described above with reference to FIG. 2 and FIG. 3.

As shown in FIG. 5, the anode current collector 340 has a characteristic current collector length $L_{CC}$. In some embodiments, $L_{CC}$ can be substantially less than the length of a conventional current collector. In some embodiments, $L_{CC}$ can be substantially less than $L_{EM}$. In some embodiments, $L_{CC}$ can be at least about 1 mm, at least about 2 mm, at least about 3 mm, at least about 4 mm, at least about 5 mm, at least about 6 mm, at least about 7 mm, at least about 8 mm, at least about 9 mm, at least about 1 cm, at least about 2 cm, at least about 3 cm, at least about 4 cm, at least about 5 cm, at least about 6 cm, at least about 7 cm, at least about 8 cm, or at least about 9 cm. In some embodiments, $L_{CC}$ can be no more than about 10 cm, no more than about 9 cm, no more than about 8 cm, no more than about 7 cm, no more than about 6 cm, no more than about 5 cm, no more than about 4 cm, no more than about 3 cm, no more than about 2 cm, no more than about 1 cm, no more than about 9 mm, no more than about 8 mm, no more than about 7 mm, no more than about 6 mm, no more than about 5 mm, no more than about 4 mm, no more than about 3 mm, or no more than about 2 mm. Combinations of the above-referenced values are also possible for $L_{CC}$ (e.g., at least about 1 mm and no more than about 10 cm or at least about 10 mm and no more than about 1 cm), inclusive of all values and ranges therebetween. In some embodiments, $L_{CC}$ can be about 1 mm, about 2 mm, about 3 mm, about 4 mm, about 5 mm, about 6 mm, about 7 mm, about 8 mm, about 9 mm, about 1 cm, about 2 cm, about 3 cm, about 4 cm, about 5 cm, about 6 cm, about 7 cm, about 8 cm, about 9 cm, or about 10 cm.

As shown in FIG. 5, the anode 305 has a characteristic current collector-electrode overlap length $L_{CCEO}$ and a characteristic tab-current collector overlap length $L_{TCCO}$. In some embodiments, $L_{CCEO}$ and/or $L_{TCCO}$ can be at least about 1 µm, at least about 5 µm, at least about 10 µm, at least about 20 µm, at least about 30 µm, at least about 40 µm, at least about 50 µm, at least about 60 µm, at least about 70 µm, at least about 80 µm, at least about 90 µm, at least about 100 µm, at least about 200 µm, at least about 300 µm, at least about 400 µm, at least about 500 µm, at least about 600 µm, at least about 700 µm, at least about 800 µm, at least about 900 µm, at least about 1 mm, at least about 2 mm, at least about 3 mm, at least about 4 mm, at least about 5 mm, at least about 6 mm, at least about 7 mm, at least about 8 mm, at least about 9 mm, at least about 1 cm, at least about 2 cm, at least about 3 cm, or at least about 4 cm. In some embodiments, $L_{CCEO}$ and/or $L_{TCCO}$ can be no more than about 5 cm, no more than about 4 cm, no more than about 3 cm, no more than about 2 cm, no more than about 1 cm, no more than about 9 mm, no more than about 8 mm, no more than about 7 mm, no more than about 6 mm, no more than about 5 mm, no more than about 4 mm, no more than about 3 mm, no more than about 2 mm, no more than about 1 mm, no more than about 900 µm, no more than about 800 µm, no more than about 700 µm, no more than about 600 µm, no more than about 500 µm, no more than about 400 µm, no more than about 300 µm, no more than about 200 µm, no more than about 100 µm, no more than about 90 µm, no more than about 80 µm, no more than about 70 µm, no more than about 60 µm, no more than about 50 µm, no more than about 40 µm, no more than about 30 µm, no more than about 20 µm, no more than about 10 µm, no more than about 9 µm, no more than about 8 µm, no more than about 7 µm, no more than about 6 µm, no more than about 5 µm, no more than about 4 µm, no more than about 3 µm, or no more than about 2 µm. Combinations of the above-referenced values are also possible for $L_{CCEO}$ and/or $L_{TCCO}$ (e.g., at least about 1 µm and no more than about 5 cm or at least about 10 µm and no more than about 50 µm), inclusive of all values and ranges therebetween. In some embodiments, $L_{CCEO}$ and/or $L_{TCCO}$ can be about 1 µm, about 2 µm, about 3 µm, about 4 µm, about 5 µm, about 6 µm, about 7 µm, about 8 µm, about 9 µm, about 10 µm, about 20 µm, about 30 µm, about 40 µm, about 50 µm, about 60 µm, about 70 µm, about 80 µm, about 90 µm, about 100 µm, about 200 µm, about 300 µm, about 400 µm, about 500 µm, about 600 µm, about 700 µm, about 800 µm, about 900 µm, about 1 mm, about 2 mm, about 3 mm, about 4 mm, about 5 mm, about 6 mm, about 7 mm, about 8 mm, about 9 mm, about 1 cm, about 2 cm, about 3 cm, about 4 cm, or about 5 cm. In some embodiments, the anode 305 can have no or substantially no current collector-electrode overlap (i.e., $L_{CCEO}$ can be about 0 µm). In some embodiments, the anode 305 can have no or substantially no tab-current collector overlap (i.e., $L_{TCCO}$ can be about 0 µm).

In some embodiments, the ratio of $L_{CC}:L_{EM}$ can be at least about 1:50, at least about 1:40, at least about 1:30, at least about 1:20, at least about 1:10, at least about 1:9, at least about 1:8, at least about 1:7, at least about 1:6, at least about 1:5, at least about 1:4, at least about 1:3, at least about 1:2, at least about 1:1.75, at least about 1:1.5, at least about 1:1.25, at least about 1:1, at least about 1:0.75, at least about 2:1, at least about 3:1, at least about 4:1, at least about 5:1, at least about 6:1, at least about 7:1, at least about 8:1, or at least about 9:1. In some embodiments, the ratio of $L_{CC}:L_{EM}$ can be no more than about 10:1, no more than about 9:1, no more than about 8:1, no more than about 7:1, no more than about 6:1, no more than about 5:1, no more than about 4:1, no more than about 3:1, no more than about 2:1, no more than about 1:0.75, no more than about 1:1, no more than about 1:1.25, no more than about 1:1.5, no more than about 1:1.75, no more than about 1:2, no more than about 1:3, no more than about 1:4, no more than about 1:5, no more than about 1:6, no more than about 1:7, no more than about 1:8, no more than about 1:9, no more than about 1:10, no more than about 1:20, no more than about 1:30, or no more than about 1:40. Combinations of the above-referenced values are also possible for the ratio of $L_{CC}:L_{EM}$ (e.g., at least about 1:50 and no more than about 10:1 or at least about 1:10 and no more than about 1:1), inclusive of all values and ranges therebetween. In some embodiments, the ratio of $L_{CC}:L_{EM}$ can be about 1:50, about 1:40, about 1:30, about 1:20, about 1:10, about 1:9, about 1:8, about 1:7, about 1:6, about 1:5, about 1:4, about 1:3, about 1:2, about 1:1.75, about 1:1.5, about 1:1.25, about 1:1, about 1:0.75, about 2:1, about 3:1, about 4:1, about 5:1, about 6:1, about 7:1, about 8:1, about 9:1, or about 10:1.

In some embodiments, the ratio of $L_{TCCO}:L_{CC}$ can be at least about 1:1000, at least about 1:900, at least about 1:800, at least about 1:700, at least about 1:600, at least about 1:500, at least about 1:400, at least about 1:300, at least about 1:200, at least about 1:100, at least about 1:90, at least about 1:80, at least about 1:70, at least about 1:60, at least about 1:50, at least about 1:40, at least about 1:30, at least about 1:20, at least about 1:10, at least about 1:9, at least about 1:8, at least about 1:7, at least about 1:6, at least about 1:5, at least about 1:4, at least about 1:3, at least about 1:2, at least about 1:1.9, at least about 1:1.8, at least about 1:1.7, or at least about 1:1.6. In some embodiments, the ratio of $L_{TCCO}:L_{CC}$ can be no more than about 1:1.5, no more than about 1:1.6, no more than about 1:1.7, no more than about 1:1.8, no more than about 1:1.9, no more than about 1:2, no more than about 1:3, no more than about 1:4, no more than about 1:5, no more than about 1:6, no more than about 1:7, no more than about 1:8, no more than about 1:9, no more than about 1:10, no more than about 1:20, no more than about 1:30, no more than about 1:40, no more than about 1:50, no more than about 1:60, no more than about 1:70, no more than about 1:80, no more than about 1:90, no more than about 1:100, no more than about 1:200, no more than about 1:300, no more than about 1:400, no more than about 1:500, no more than about 1:600, no more than about 1:700, no more than about 1:800, or no more than about 1:900. Combinations of the above-referenced values are also possible for the ratio of $L_{TCCO}:L_{CC}$ (e.g., at least about 1:1000 and no more than about 1:1.5 or at least about 1:100 and no more than about 1:50), inclusive of all values and ranges therebetween. In some embodiments, the ratio of $L_{TCCO}:L_{CC}$ can be about 1:1000, about 1:900, about 1:800, about 1:700, about 1:600, about 1:500, about 1:400, about 1:300, about 1:200, about 1:100, about 1:90, about 1:80, about 1:70, about 1:60, about 1:50, about 1:40, about 1:30, about 1:20, about 1:10, about 1:9, about 1:8, about 1:7, about 1:6, about 1:5, about 1:4, about 1:3, about 1:2, about 1:1.9, about 1:1.8, about 1:1.7, about 1:1.6, or about 1:1.5.

In some embodiments, the ratio of $L_{CCEO}:L_{EM}$ can be at least about 1:1000, at least about 1:900, at least about 1:800, at least about 1:700, at least about 1:600, at least about 1:500, at least about 1:400, at least about 1:300, at least about 1:200, at least about 1:100, at least about 1:90, at least about 1:80, at least about 1:70, at least about 1:60, at least about 1:50, at least about 1:40, at least about 1:30, at least about 1:20, at least about 1:10, at least about 1:9, at least about 1:8, at least about 1:7, at least about 1:6, at least about 1:5, at least about 1:4, at least about 1:3, at least about 1:2, at least about 1:1.9, at least about 1:1.8, at least about 1:1.7, or at least about 1:1.6. In some embodiments, the ratio of $L_{CCEO}:L_{EM}$ can be no more than about 1:1.5, no more than about 1:1.6, no more than about 1:1.7, no more than about 1:1.8, no more than about 1:1.9, no more than about 1:2, no more than about 1:3, no more than about 1:4, no more than about 1:5, no more than about 1:6, no more than about 1:7, no more than about 1:8, no more than about 1:9, no more than about 1:10, no more than about 1:20, no more than about 1:30, no more than about 1:40, no more than about 1:50, no more than about 1:60, no more than about 1:70, no more than about 1:80, no more than about 1:90, no more than about 1:100, no more than about 1:200, no more than about 1:300, no more than about 1:400, no more than about 1:500, no more than about 1:600, no more than about 1:700, no more than about 1:800, or no more than about 1:900. Combinations of the above-referenced values are also possible for the ratio of $L_{CCEO}:L_{EM}$ (e.g., at least about 1:1000 and no more than about 1:1.5 or at least about 1:100 and no more than about 1:50), inclusive of all values and ranges therebetween. In some embodiments, the ratio of $L_{CCEO}:L_{EM}$ can be about 1:1000, about 1:900, about 1:800, about 1:700, about 1:600, about 1:500, about 1:400, about 1:300, about 1:200, about 1:100, about 1:90, about 1:80, about 1:70, about 1:60, about 1:50, about 1:40, about 1:30, about 1:20, about 1:10, about 1:9, about 1:8, about 1:7, about 1:6, about 1:5, about 1:4, about 1:3, about 1:2, about 1:1.9, about 1:1.8, about 1:1.7, about 1:1.6, or about 1:1.5.

In some embodiments, the anode current collector 340 can physically contact only a portion of the total surface area of the anode material 310. In some embodiments, the anode current collector 340 can physically contact less than about 25%, less than about 20%, less than about 18%, less than about 16%, less than about 14%, less than about 12%, less than about 10%, less than about 9%, less than about 8%, less than about 7%, less than about 6%, less than about 5%, less than about 4%, less than about 3%, less than about 2%, less than about 1%, less than about 0.75%, less than about 0.5%, less than about 0.25%, less than about 0.1%, less than about 0.075%, less than about 0.05%, less than about 0.025%, or less than about 0.01% of the total surface area of the anode material 310, inclusive of all values and ranges therebetween.

In some embodiments, the anode current collector 340 can physically contact only a portion of the total surface area of a single side of the anode material 310. In some embodiments, the anode current collector 340 can physically contact less than about 50%, less than about 45%, less than about 40%, less than about 35%, less than about 30%, less than about 25%, less than about 20%, less than about 18%, less than about 16%, less than about 14%, less than about 12%, less than about 10%, less than about 9%, less than about 8%, less than about 7%, less than about 6%, less than about 5%, less than about 4%, less than about 3%, less than about 2%, less than about 1%, less than about 0.75%, less than about 0.5%, less than about 0.25%, less than about 0.1%, less than about 0.075%, less than about 0.05%, less than about 0.025%, less than about 0.01%, less than about 0.0075%, or less than about 0.005% of the total surface area of a single side of the anode material 310, inclusive of all values and ranges therebetween.

In some embodiments, the anode material 310 can include a porous material, such that the total surface area of the anode material 310 is significantly higher than the external surface area of the anode material 310. In some embodiments, the tabbing area of the anode material 310 can be defined as the equivalent surface area of smooth, nonporous material with the same form factor as the anode material 310. For example, if the anode material 310 includes a porous material and is formed into a rectangular prism form factor, then the external surface area can be calculated as the surface area of a smooth, non-porous rectangular prism with the same dimensions as the anode material 310. In some embodiments, the anode current collector 340 can physically contact less than about 25%, less than about 20%, less than about 18%, less than about 16%, less than about 14%, less than about 12%, less than about 10%, less than about 9%, less than about 8%, less than about 7%, less than about 6%, less than about 5%, less than about 4%, less than about 3%, less than about 2%, less than about 1%, less than about 0.75%, less than about 0.5%, less than about 0.25%, less than about 0.1%, less than about 0.075%, less than about 0.05%, less than about 0.025%, or less than about 0.01% of the tabbing area of the anode material 310, inclusive of all values and ranges therebetween.

In some embodiments, the anode current collector 340 can physically contact less than about 50%, less than about 45%, less than about 40%, less than about 35%, less than about 30%, less than about 25%, less than about 20%, less than about 18%, less than about 16%, less than about 14%, less than about 12%, less than about 10%, less than about 9%, less than about 8%, less than about 7%, less than about 6%, less than about 5%, less than about 4%, less than about 3%, less than about 2%, less than about 1%, less than about 0.75%, less than about 0.5%, less than about 0.25%, less than about 0.1%, less than about 0.075%, less than about 0.05%, less than about 0.025%, less than about 0.01%, less than about 0.0075%, or less than about 0.005% of the tabbing area of a single side of the anode material 310, inclusive of all values and ranges therebetween.

In some embodiments, the anode material 310 can have a characteristic length $L_{EM}$. In some embodiments, the cathode material 350 can have a characteristic length $L_{CM}$. In some embodiments, $L_{CM}$ can be the same or substantially similar to $L_{EM}$. In some embodiments, $L_{CM}$ can be less than $L_{EM}$. In some embodiments, $(L_{EM}-L_{CM})$ can be at least about 1 μm, at least about 5 μm, at least about 10 μm, at least about 50 μm, at least about 100 μm, at least about 500 μm, at least about 1 mm, at least about 5 mm, at least about 1 cm, or at least about 5 cm. In some embodiments, $(L_{EM}-L_{CM})$ can be no more than about 10 cm, no more than about 5 cm, no more than about 1 cm, no more than about 5 mm, no more than about 1 mm, no more than about 500 μm, no more than about 100 μm, no more than about 50 μm, no more than about 10 μm, or no more than about 5 μm. Combinations of the above-referenced values are also possible for $(L_{EM}-L_{CM})$ (e.g., at least about 1 μm and no more than about 10 cm or at least about 10 mm and no more than about 1 cm), inclusive of all values and ranges therebetween. In some embodiments, $(L_{EM}-L_{CM})$ can be about 1 μm, about 5 μm, about 10 μm, about 50 μm, about 100 μm, about 500 μm, about 1 mm, about 5 mm, about 1 cm, about 5 cm, or about 10 cm.

In some embodiments, the separator 390 can include a separator seal 395 that can restrict the flow paths of ions through the separator 390. The restriction of flow paths through the separator 390 can guide the flow path of the ions, such that the ions go into the anode material 310 and/or the cathode material 350, and do not become deposited around the outside perimeter of the anode material 310 and/or the cathode material 350. In some embodiments, the separator seal 395 can be a tape or an adhesive material adhered to the outside surface of the separator 390. In some embodiments, the separator seal 395 can be melted together with the separator 390 such that the separator 390 and the separator seal 395 are thermally bonded together. In some embodiments, the separator seal 395 can be a gel, a high viscosity oil, and/or a material that permeates into the pores of portions of the separator 390, thereby blocking the flow of materials through those pores.

As shown in FIG. 4, the separator seal 395 defines a first edge E1 and a second edge E2 of an active region of the anode material 310 and the cathode material 350. The active region of the anode material 310 and the cathode material 350 is a region, in which ions can move freely between the anode material 310 and the cathode material 350. As shown, the separator seal 395 prevents or substantially inhibits movement of ions through the portion of the separator 390 with the separator seal 390. In some embodiments, in which the separator 390 does not include a separator seal 395, the first edge E1 and the second edge E2 of the active region can be defined by the outer edges of the cathode material 350 (when $L_{CM}$ is less than $L_{EM}$). In some embodiments, in which the separator 390 does not include a separator seal 395, the first edge E1 and the second edge E2 of the active region can be defined by the outer edges of the anode material 310 (when $L_{EM}$ is less than $L_{CM}$).

As shown, the anode current collector 340 does not extend into the active region of the anode material 310. In some embodiments, the anode current collector 340 can extend into the active region of the anode material 310. In some embodiments, the electrochemical cell 300 can have a characteristic current collector-active region length $L_{CCAR}$, defined as the minimum distance between the edge of the anode current collector 340 and the first edge E1 of the active region of the anode material 310. In some embodiments, $L_{CC}$ can be at least about 1 µm, at least about 5 µm, at least about 10 µm, at least about 20 µm, at least about 30 µm, at least about 40 µm, at least about 50 µm, at least about 60 µm, at least about 70 µm, at least about 80 µm, at least about 90 µm, at least about 100 µm, at least about 200 µm, at least about 300 µm, at least about 400 µm, at least about 500 µm, at least about 600 µm, at least about 700 µm, at least about 800 µm, at least about 900 µm, at least about 1 mm, at least about 2 mm, at least about 3 mm, at least about 4 mm, at least about 5 mm, at least about 6 mm, at least about 7 mm, at least about 8 mm, at least about 9 mm, at least about 1 cm, at least about 2 cm, at least about 3 cm, or at least about 4 cm. In some embodiments, $L_{CCAR}$ can be no more than about 5 cm, no more than about 4 cm, no more than about 3 cm, no more than about 2 cm, no more than about 1 cm, no more than about 9 mm, no more than about 8 mm, no more than about 7 mm, no more than about 6 mm, no more than about 5 mm, no more than about 4 mm, no more than about 3 mm, no more than about 2 mm, no more than about 1 mm, no more than about 900 µm, no more than about 800 µm, no more than about 700 µm, no more than about 600 µm, no more than about 500 µm, no more than about 400 µm, no more than about 300 µm, no more than about 200 µm, no more than about 100 µm, no more than about 90 µm, no more than about 80 µm, no more than about 70 µm, no more than about 60 µm, no more than about 50 µm, no more than about 40 µm, no more than about 30 µm, no more than about 20 µm, no more than about 10 µm, no more than about 9 µm, no more than about 8 µm, no more than about 7 µm, no more than about 6 µm, no more than about 5 µm, no more than about 4 µm, no more than about 3 µm, or no more than about 2 µm. Combinations of the above-referenced values are also possible for $L_{CC}$ (e.g., at least about 1 µm and no more than about 5 cm or at least about 10 µm and no more than about 50 µm), inclusive of all values and ranges therebetween. In some embodiments, $L_{CCAR}$ can be about 1 µm, about 2 µm, about 3 µm, about 4 µm, about 5 µm, about 6 µm, about 7 µm, about 8 µm, about 9 µm, about 10 µm, about 20 µm, about 30 µm, about 40 µm, about 50 µm, about 60 µm, about 70 µm, about 80 µm, about 90 µm, about 100 µm, about 200 µm, about 300 µm, about 400 µm, about 500 µm, about 600 µm, about 700 µm, about 800 µm, about 900 µm, about 1 mm, about 2 mm, about 3 mm, about 4 mm, about 5 mm, about 6 mm, about 7 mm, about 8 mm, about 9 mm, about 1 cm, about 2 cm, about 3 cm, about 4 cm, or about 5 cm.

In some embodiments, the ratio of $L_{CCAR}:L_{EM}$ can be at least about 1:1000, at least about 1:900, at least about 1:900, at least about 1:800, at least about 1:700, at least about 1:600, at least about 1:500, at least about 1:400, at least about 1:300, at least about 1:200, at least about 1:100, at least about 1:90, at least about 1:80, at least about 1:70, at least about 1:60, at least about 1:50, at least about 1:40, at least about 1:30, at least about 1:20, at least about 1:10, at least about 1:9, at least about 1:8, at least about 1:7, at least about 1:6, at least about 1:5, at least about 1:4, at least about 1:3, at least about 1:2, at least about 1:1.9, at least about 1:1.8, at least about 1:1.7, or at least about 1:1.6. In some embodiments, the ratio of $L_{CCAR}:L_{EM}$ can be no more than about 1:1.5, no more than about 1:1.6, no more than about 1:1.7, no more than about 1:1.8, no more than about 1:1.9, no more than about 1:2, no more than about 1:3, no more than about 1:4, no more than about 1:5, no more than about 1:6, no more than about 1:7, no more than about 1:8, no more than about 1:9, no more than about 1:10, no more than about 1:20, no more than about 1:30, no more than about 1:40, no more than about 1:50, no more than about 1:60, no more than about 1:70, no more than about 1:80, no more than about 1:90, no more than about 1:100, no more than about 1:200, no more than about 1:300, no more than about 1:400, no more than about 1:500, no more than about 1:600, no more than about 1:700, no more than about 1:800, or no more than about 1:900. Combinations of the above-referenced values are also possible for the ratio of $L_{CCAR}:L_{EM}$ (e.g., at least about 1:1000 and no more than about 1:1.5 or at least about 1:100 and no more than about 1:50), inclusive of all values and ranges therebetween. In some embodiments, the ratio of $L_{CCAR}:L_{EM}$ can be about 1:1000, about 1:900, about 1:800, about 1:700, about 1:600, about 1:500, about 1:400, about 1:300, about 1:200, about 1:100, about 1:90, about 1:80, about 1:70, about 1:60, about 1:50, about 1:40, about 1:30, about 1:20, about 1:10, about 1:9, about 1:8, about 1:7, about 1:6, about 1:5, about 1:4, about 1:3, about 1:2, about 1:1.9, about 1:1.8, about 1:1.7, about 1:1.6, or about 1:1.5.

As shown, the anode tab 330 is disposed on a side of the anode current collector 340 distal to the anode film 320 (i.e., on the top side of the anode current collector 340 when viewed from the perspective of FIG. 5). In some embodiments, the anode tab 330 can be disposed between the anode current collector 340 and the anode film 320 (i.e., on the underside of anode current collector 340 when viewed from the perspective of FIG. 5). As shown, the anode current collector 340 is disposed on the underside of the anode material 310 when viewed from the perspective of FIG. 5. In some embodiments, the anode current collector 340 can be disposed on the topside of the anode material 310 when viewed from the perspective of FIG. 5.

As shown, the anode material 310 is coupled directly to the anode film 320 and the anode current collector 340 is smaller than a conventional anode current collector. In some embodiments, the cathode material 350 can be coupled directly to the cathode film 360 and the cathode current collector 380 can be smaller than a conventional cathode current collector. In some embodiments, the anode material 310 can be coupled directly to the anode film 320, the cathode material 350 can be coupled directly to the cathode film 360, the anode current collector 340 can be smaller than a conventional anode current collector, and the cathode current collector 380 can be smaller than a conventional cathode current collector. In some embodiments, the cathode current collector 380 can be smaller than a conventional cathode current collector and the $L_{CC}$ values, $L_{CCEO}$ values, $L_{TCCO}$ values, $L_{TAR}$ values, $L_{CC}:L_{EM}$ ratios, $L_{TCCO}:L_{CC}$ ratios, $L_{CCEO}:L_{EM}$ ratios, and $L_{CCAR}:L_{EM}$ ratios applied to the cathode can be the same or substantially similar to the $L_{CC}$ values, $L_{CCEO}$ values, $L_{TCCO}$ values, $L_{TAR}$ values, $L_{CC}:L_{EM}$ ratios, $L_{TCCO}:L_{CC}$ ratios, $L_{CCEO}:L_{EM}$ ratios, and $L_{CCAR}:L_{EM}$ ratios as described above with reference to the anode 305.

Examples

Figure 6:
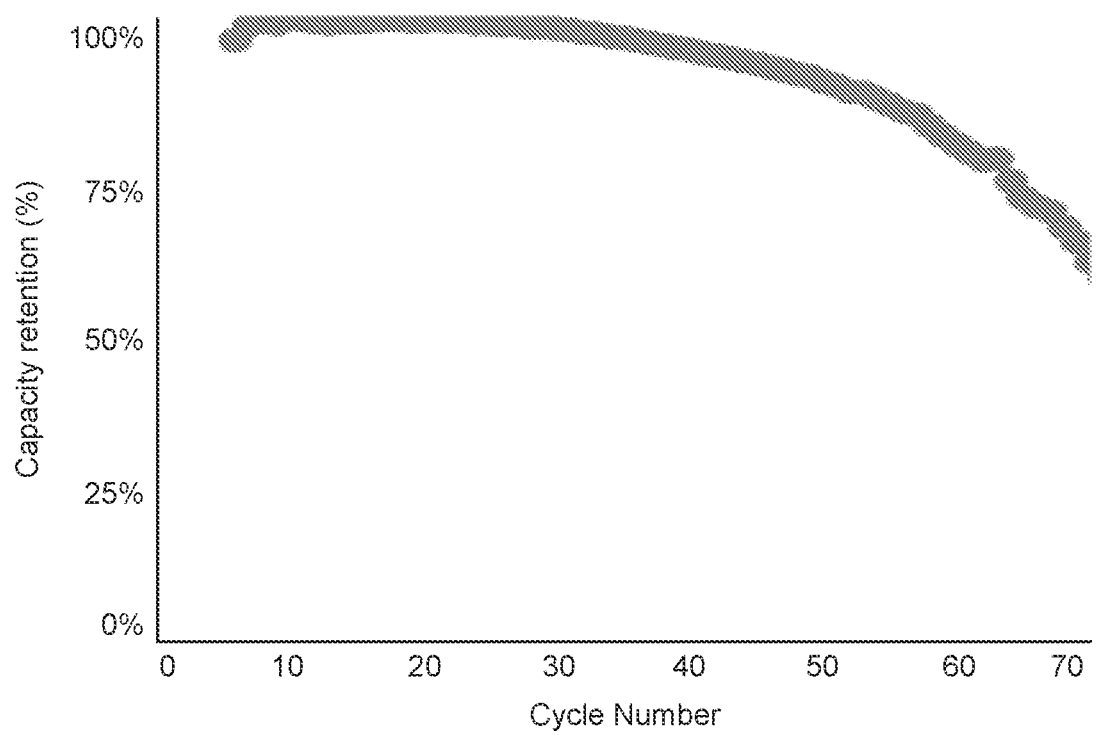
FIG. 6 shows cycling data of an electrochemical cell with an anode weld tab coupled directly to an anode.

An electrochemical cell was constructed with a 2 μm thickness lithium anode and a LiNiMnCo (NMC) 811 cathode with a 200 μm thickness and an energy density of 11 mAh/cm$^2$. The electrochemical cell did not include an anode current collector, but only a weld tab coupled directly to the anode. The electrochemical cell was cycled between 4.3 V and 2.8 V at a 1 C discharge rate and 2 mA/cm$^2$ charge rate for 70 cycles at 25° C. FIG. 6 shows cycling data and capacity retention of the electrochemical cell over 70 cycles, with 100% capacity corresponding to a capacity of 170 mAh.

Various concepts may be embodied as one or more methods, of which at least one example has been provided. The acts performed as part of the method may be ordered in any suitable way. Accordingly, embodiments may be constructed in which acts are performed in an order different than illustrated, which may include performing some acts simultaneously, even though shown as sequential acts in illustrative embodiments. Put differently, it is to be understood that such features may not necessarily be limited to a particular order of execution, but rather, any number of threads, processes, services, servers, and/or the like that may execute serially, asynchronously, concurrently, in parallel, simultaneously, synchronously, and/or the like in a manner consistent with the disclosure. As such, some of these features may be mutually contradictory, in that they cannot be simultaneously present in a single embodiment. Similarly, some features are applicable to one aspect of the innovations, and inapplicable to others.

In addition, the disclosure may include other innovations not presently described. Applicant reserves all rights in such innovations, including the right to embodiment such innovations, file additional applications, continuations, continuations-in-part, divisional s, and/or the like thereof. As such, it should be understood that advantages, embodiments, examples, functional, features, logical, operational, organizational, structural, topological, and/or other aspects of the disclosure are not to be considered limitations on the disclosure as defined by the embodiments or limitations on equivalents to the embodiments. Depending on the particular desires and/or characteristics of an individual and/or enterprise user, database configuration and/or relational model, data type, data transmission and/or network framework, syntax structure, and/or the like, various embodiments of the technology disclosed herein may be implemented in a manner that enables a great deal of flexibility and customization as described herein.

All definitions, as defined and used herein, should be understood to control over dictionary definitions, definitions in documents incorporated by reference, and/or ordinary meanings of the defined terms.

As used herein, in particular embodiments, the terms "about" or "approximately" when preceding a numerical value indicates the value plus or minus a range of 10%. Where a range of values is provided, it is understood that each intervening value, to the tenth of the unit of the lower limit unless the context clearly dictates otherwise, between the upper and lower limit of that range and any other stated or intervening value in that stated range is encompassed within the disclosure. That the upper and lower limits of these smaller ranges can independently be included in the smaller ranges is also encompassed within the disclosure, subject to any specifically excluded limit in the stated range. Where the stated range includes one or both of the limits, ranges excluding either or both of those included limits are also included in the disclosure.

The phrase "and/or," as used herein in the specification and in the embodiments, should be understood to mean "either or both" of the elements so conjoined, i.e., elements that are conjunctively present in some cases and disjunctively present in other cases. Multiple elements listed with "and/or" should be construed in the same fashion, i.e., "one or more" of the elements so conjoined. Other elements may optionally be present other than the elements specifically identified by the "and/or" clause, whether related or unrelated to those elements specifically identified. Thus, as a non-limiting example, a reference to "A and/or B", when used in conjunction with open-ended language such as "comprising" can refer, in one embodiment, to A only (optionally including elements other than B); in another embodiment, to B only (optionally including elements other than A); in yet another embodiment, to both A and B (optionally including other elements); etc.

As used herein in the specification and in the embodiments, "or" should be understood to have the same meaning as "and/or" as defined above. For example, when separating items in a list, "or" or "and/or" shall be interpreted as being inclusive, i.e., the inclusion of at least one, but also including more than one, of a number or list of elements, and, optionally, additional unlisted items. Only terms clearly indicated to the contrary, such as "only one of" or "exactly one of," or, when used in the embodiments, "consisting of," will refer to the inclusion of exactly one element of a number or list of elements. In general, the term "or" as used herein shall only be interpreted as indicating exclusive alternatives (i.e. "one or the other but not both") when preceded by terms of exclusivity, such as "either," "one of," "only one of" or "exactly one of." "Consisting essentially of," when used in the embodiments, shall have its ordinary meaning as used in the field of patent law.

As used herein in the specification and in the embodiments, the phrase "at least one," in reference to a list of one or more elements, should be understood to mean at least one element selected from any one or more of the elements in the list of elements, but not necessarily including at least one of each and every element specifically listed within the list of elements and not excluding any combinations of elements in the list of elements. This definition also allows that elements may optionally be present other than the elements specifically identified within the list of elements to which the phrase "at least one" refers, whether related or unrelated to those elements specifically identified. Thus, as a non-limiting example, "at least one of A and B" (or, equivalently, "at least one of A or B," or, equivalently "at least one of A and/or B") can refer, in one embodiment, to at least one, optionally including more than one, A, with no B present (and optionally including elements other than B); in another embodiment, to at least one, optionally including more than one, B, with no A present (and optionally including elements other than A); in yet another embodiment, to at least one, optionally including more than one, A, and at least one, optionally including more than one, B (and optionally including other elements); etc.

In the embodiments, as well as in the specification above, all transitional phrases such as "comprising," "including," "carrying," "having," "containing," "involving," "holding," "composed of," and the like are to be understood to be open-ended, i.e., to mean including but not limited to. Only the transitional phrases "consisting of" and "consisting essentially of" shall be closed or semi-closed transitional phrases, respectively, as set forth in the United States Patent Office Manual of Patent Examining Procedures, Section 2111.03.

While specific embodiments of the present disclosure have been outlined above, many alternatives, modifications, and variations will be apparent to those skilled in the art. Accordingly, the embodiments set forth herein are intended to be illustrative, not limiting. Various changes may be made without departing from the spirit and scope of the disclosure. Where methods and steps described above indicate certain events occurring in a certain order, those of ordinary skill in the art having the benefit of this disclosure would recognize that the ordering of certain steps may be modified and such modification are in accordance with the variations of the invention. Additionally, certain of the steps may be performed concurrently in a parallel process when possible, as well as performed sequentially as described above. The embodiments have been particularly shown and described, but it will be understood that various changes in form and details may be made.

The invention claimed is:

1. An electrochemical cell, comprising:
   a first electrode material disposed on a first current collector, the first current collector coupled to a first non-conductive film;
   a first tab coupled to the first current collector;
   a second electrode material capable of taking up or releasing ions during operation of the electrochemical cell, the second electrode material including a semi-solid material coupled directly to a second non-conductive film, the second non-conductive film including a first layer and a second layer;
   a second tab electronically coupled to the second electrode material; and
   a separator disposed between the first electrode material and the second electrode material.

2. The electrochemical cell of claim 1, wherein the second electrode material is not coupled to a current collector.

3. The electrochemical cell of claim 1, wherein the first non-conductive film is coupled to the second non-conductive film to create a pouch.

4. The electrochemical cell of claim 1, wherein the second electrode material and the second tab are coupled to a second current collector.

5. The electrochemical cell of claim 4, wherein the second current collector physically contacts less than about 3% of the total surface area of the second electrode material.

6. The electrochemical cell of claim 1, wherein the electrochemical cell has a specific energy of at least about 300 Wh/kg.

7. The electrochemical cell of claim 1, wherein the electrochemical cell has a cell specific energy of at least about 600 Wh/kg.

8. The electrochemical cell of claim 1, wherein the first non-conductive film and/or the second non-conductive film includes at least one of polyethylene terephthalate (PET), polybutylene terephthalate (PBT), nylon, high-density polyethylene (HDPE), oriented polypropylene (o-PP), polyvinyl chloride (PVC), polyimide (PI), polysulfone (PSU), cast polypropylene (c-PP), polyethylene (PE), ethylene vinylacetate (EVA), PET, Poly-vinyl acetate (PVA), polyamide (PA), acrylic adhesives, ultraviolet (UV)/electron beam (EB)/infrared (IR) curable resin, polyether ether ketone (PEEK), polyethylene naphthalate (PEN), polyethersulfone (PES), Polyimide, (PI), polyphenylene sulfide (PPS), and polyphenyleneoxide (PPO).

9. The electrochemical cell of claim 1, wherein the first electrode material and/or the second electrode material includes a semi-solid, binderless electrode material.

10. An electrochemical cell, comprising:
    an anode material coupled directly to a first non-conductive film, the anode material including a semi-solid material;
    an anode table coupled directly to the anode;
    a cathode material coupled to a cathode current collector, the cathode current collector coupled to a second non-conductive film;
    a cathode tab coupled to the cathode current collector; and
    a separator disposed between the anode material and the cathode material.

11. The electrochemical cell of claim 10, wherein:
    the anode material includes a first surface coupled to the first non-conductive film and a second surface coupled to the separator, with at least about 70% of the first surface contacting the first non-conductive film.

12. The electrochemical cell of claim 11, wherein at least about 80% of the first surface contacts the first non-conductive film.

13. The electrochemical cell of claim 12, wherein at least about 90% of the first surface contacts the first non-conductive film.

14. The electrochemical cell of claim 10, wherein the first non-conductive film is coupled to the second non-conductive film to create a pouch.

15. The electrochemical cell of claim 10, wherein the first non-conductive film and/or the second non-conductive film includes at least one of polyethylene terephthalate (PET), polybutylene terephthalate (PBT), nylon, high-density polyethylene (HDPE), oriented polypropylene (o-PP), polyvinyl chloride (PVC), polyimide (PI), polysulfone (PSU), cast polypropylene (c-PP), polyethylene (PE), ethylene vinylacetate (EVA), PET, Poly-vinyl acetate (PVA), polyamide (PA), acrylic adhesives, ultraviolet (UV)/electron beam (EB)/infrared (IR) curable resin, polyether ether ketone (PEEK), polyethylene naphthalate (PEN), polyethersulfone (PES), Polyimide, (PI), polyphenylene sulfide (PPS), and polyphenyleneoxide (PPO).

16. A method of forming an electrochemical cell, the method comprising:

disposing a first electrode material onto a first current collector, the first current collector coupled to a first tab;

disposing the first current collector onto a first non-conductive film;

disposing a second electrode material directly onto a second non-conductive film, the second electrode material including a semi-solid material and capable of taking up or releasing ions during operation of the electrochemical cell;

electronically coupling a second tan to the second electrode material; and disposing a separator between the first electrode material and the second electrode material.

17. The method of claim 16, further comprising:
coupling the first non-conductive film to the second non-conductive film to form a pouch.

18. The method of claim 16, further comprising:
coupling the second electrode material directly to a second current collector.

19. The method of claim 18, wherein the second current collector physically contacts less than about 3% of the total surface area of the second electrode material.

20. The method of claim 16, wherein disposing the second electrode material directly onto the second non-conductive film is via at least one of sputtering, vapor deposition, sol-gel, physical spray method, electric beam deposition, electrochemical deposition, atomic layer deposition (ALD), chemical vapor deposition (CVD), electric phoretic deposition (EPD), casting, electron beam-induced deposition (EBD), slot-die coating, gravure coating, or Langmuir-Blodgett film coating.

21. The method of claim 16, wherein disposing the second electrode material directly onto the second non-conductive film is via a layer of material that can be activated to act as an adhesive under the application of heat, light, such as UV or IR, or mechanical or electrical perturbation, such as ultrasonic or acoustic wave, or radio frequency or microwave.

22. The method of claim 16, wherein electronically coupling the second tab to the second electrode material is via at least one of mechanical compression, use of an electrically conductive paste, chemical joining, welding, brazing, soldering, or crimping.

23. The method of claim 1, wherein the first layer is made of a first material and the second layer is made of a second material.

24. The method of claim 23, wherein the first and second layers are made of same material.

* * * * *

UNITED STATES PATENT AND TRADEMARK OFFICE
CERTIFICATE OF CORRECTION

PATENT NO. : 11,749,804 B2
APPLICATION NO. : 17/181554
DATED : September 5, 2023
INVENTOR(S) : Junzheng Chen et al.

It is certified that error appears in the above-identified patent and that said Letters Patent is hereby corrected as shown below:

In the Claims

Column 26, Line 31 Claim 10:
"an anode table coupled directly to the anode;"
Should be:
"an anode tab coupled directly to the anode;"

Column 28, Line 4 Claim 20:
"chemical vapor deposition (CVD), electric phoretic deposi-"
Should be:
"chemical vapor deposition (CVD), electrophoretic deposi-"

Signed and Sealed this
Twelfth Day of March, 2024

*Katherine Kelly Vidal*

Katherine Kelly Vidal
*Director of the United States Patent and Trademark Office*